United States Patent
Hao

(10) Patent No.: US 12,417,647 B2
(45) Date of Patent: Sep. 16, 2025

(54) METHOD AND APPARATUS FOR RECOGNIZING MULTIMEDIA CONTENT

(71) Applicant: Tencent Technology (Shenzhen) Company Limited, Guangdong (CN)

(72) Inventor: Yanchao Hao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 379 days.

(21) Appl. No.: 17/967,454

(22) Filed: Oct. 17, 2022

(65) Prior Publication Data

US 2023/0032728 A1    Feb. 2, 2023

Related U.S. Application Data

(63) Continuation of application No. PCT/CN2022/086948, filed on Apr. 15, 2022.

(30) Foreign Application Priority Data

Apr. 20, 2021    (CN) .......................... 202110426652.1

(51) Int. Cl.
*G06V 30/19*    (2022.01)
*G06Q 30/02*    (2023.01)
(Continued)

(52) U.S. Cl.
CPC ... *G06V 30/19173* (2022.01); *G06Q 30/0248* (2013.01); *G06V 20/41* (2022.01);
(Continued)

(58) Field of Classification Search
None
See application file for complete search history.

(56) References Cited

U.S. PATENT DOCUMENTS

2011/0218948 A1*   9/2011   De Souza .............. G06N 20/00
                                                                                 706/12
2017/0336955 A1*   11/2017   Cho ............... H04N 21/440236
(Continued)

FOREIGN PATENT DOCUMENTS

CN        110798703       2/2020
CN        110852231 A     2/2020
(Continued)

OTHER PUBLICATIONS

Office action issued in Chinese application No. 202110426652.1, dated Nov. 18, 2024, 21 pages (with English translation).
(Continued)

*Primary Examiner* — Andrew H Lam
(74) *Attorney, Agent, or Firm* — Crowell & Moring LLP

(57) ABSTRACT

This disclosure relates to a method for recognizing multimedia content. The method includes: obtaining target text information and content information in a video; performing text recognition processing on the content information to obtain associated text information; when the original text information or the associated text information meets a first malicious promotion condition, obtaining a target text classification result by a text classification model; and determining a video recognition result corresponding to the video according to the target text classification result.

19 Claims, 16 Drawing Sheets

(51) Int. Cl.
  *G06Q 30/0241*  (2023.01)
  *G06V 20/40*    (2022.01)
  *G06V 20/62*    (2022.01)
  *G10L 15/02*    (2006.01)
  *G10L 15/26*    (2006.01)
  *G10L 25/57*    (2013.01)

(52) U.S. Cl.
  CPC ............ *G06V 20/46* (2022.01); *G06V 20/635* (2022.01); *G06V 30/19013* (2022.01); *G10L 15/02* (2013.01); *G10L 15/26* (2013.01); *G10L 25/57* (2013.01)

(56) References Cited

U.S. PATENT DOCUMENTS

2019/0364126 A1  11/2019  Todd
2020/0210442 A1   7/2020  Bergeron et al.

FOREIGN PATENT DOCUMENTS

| CN | 111460267 | 7/2020 |
| CN | 111858973 | 10/2020 |
| CN | 112257661 | 1/2021 |
| CN | 113761235 | 12/2021 |
| WO | WO 2021017260 A1 | 2/2021 |

OTHER PUBLICATIONS

International Search Report issued Jun. 27, 2022 in International (PCT) Application No. PCT/CN2022/086948.
Office action issued in Chinese application No. 202110426652.1, dated Aug. 26, 2024, 22 pages (with English translation).

* cited by examiner

| Text recognition platform 1500 | | | | |
|---|---|---|---|---|
| Text No. | Content provider | Posting time | Recognition result | |
| 00001 | Tommy ID:121616 | January 25, 2021 12:35:08 | Suspected of malicious promotion | View |
| 00002 | Nini ID:13356 | January 25, 2021 12:35:08 | Non-malicious promotion | View |
| 00003 | Xiaoming ID:359616 | January 25, 2021 12:35:08 | Malicious promotion | View |

| Image recognition platform 1800 ||||||
|---|---|---|---|---|
| Image No. | Content provider | Posting time | Recognition result | |
| 00001 | Tommy ID:121616 | January 25, 2021 12:35:08 | Suspected of malicious promotion | View |
| 00002 | Nini ID:13356 | January 25, 2021 12:35:08 | Non-malicious promotion | View |
| 00003 | Xiaoming ID:359616 | January 25, 2021 12:35:08 | Malicious promotion | View |

| Audio recognition platform 2100 ||||| 
|---|---|---|---|---|
| Audio No. | Content provider | Posting time | Recognition result | |
| 00001 | Tommy ID:121616 | January 25, 2021 12:35:08 | Suspected of malicious promotion | View |
| 00002 | Nini ID:13356 | January 25, 2021 12:35:08 | Non-malicious promotion | View |
| 00003 | Xiaoming ID:359616 | January 25, 2021 12:35:08 | Malicious promotion | View |

METHOD AND APPARATUS FOR RECOGNIZING MULTIMEDIA CONTENT

RELATED APPLICATION

This application is a continuation application of PCT Patent Application No. PCT/CN2022/086948, filed on Apr. 15, 2022, which claims priority to Chinese Patent Application No. 202110426652.1, filed with the Chinese Patent Office on Apr. 20, 2021 and entitled "RECOGNITION METHOD FOR MULTIMEDIA CONTENT, RELATED APPARATUS, DEVICE, AND STORAGE MEDIUM", wherein the content of the of the above-referenced applications is incorporated herein by reference in its entirety.

FIELD OF THE TECHNOLOGY

This disclosure relates to the technical field of cloud computing, in particular to recognition of multimedia content.

BACKGROUND OF THE DISCLOSURE

With the vigorous development of video applications, the video content ecology has changed dramatically and more and more public-facing multimedia content (such as videos, images, texts or audios) mainly uploaded by users is released. A large number of multimedia content for malicious promotion have seriously endangered the development of content ecology.

At present, advertising malicious promotion texts can be recognized.

However, there are various contents of malicious promotion, which update very frequently, resulting in that the accuracy of recognizing malicious promotion information is low and it is difficult to effectively fight against the information.

SUMMARY

Embodiments of this disclosure provide a recognition method for multimedia content, a related apparatus, a device, and a storage medium. The malicious promotion extent of multimedia content is recognized from different aspects. With regard to the media form of video type multimedia content, a more comprehensive grasp for the quality of videos is conducted in the aspects of titles, abstracts, images, audios, etc. to form a more complete recognition policy for video malicious promotion, thereby improving the accuracy of recognizing the video malicious promotion.

In view of this, according to one aspect of this disclosure, a recognition method for multimedia content is provided, including:

obtaining target text information and content information in a video, the target text information comprising a title text or an abstract text, and the content information comprising image data or audio data;

performing text recognition processing on the content information to obtain associated text information, the associated text information comprising an image text or an audio text, the image text being obtained by text recognition of the image data, and the audio text being obtained by text recognition of the audio data;

taking the target text information meeting a first malicious promotion condition or the associated text information as text content;

obtaining, with a text classification model, a target text classification result based on the text content, the target text classification result representing a malicious promotion extent of the text content; and determining a video recognition result corresponding to the video according to the target text classification result, the video recognition result representing a malicious promotion extent of the video.

According to another aspect of this disclosure, a recognition method for multimedia content is provided, including:

obtaining target text information of a text and original text information for the text, the target text information comprising a title text or an abstract text and the original text information comprising comment information or bullet screen information;

in response to the target text information meeting a first malicious promotion condition, obtaining, with a text classification model, a target text classification result based on the target text information, the target text classification result indicating a malicious promotion extent of the target text information;

in response to the original text information meeting the first malicious promotion condition, obtaining, with the text classification model, an original text classification result based on the original text information, the original text classification result indicating a malicious promotion extent of the original text information; and determining a text recognition result corresponding to the text according to the target text classification result and the original text classification result, the text recognition result indicating a malicious promotion extent of the text.

According to another aspect of this disclosure, a recognition method for multimedia content is provided, including:

obtaining image data of an image to be recognized and original text information for the image, the original text information including at least one of comment information and bullet screen information;

performing text recognition processing on the image data to obtain an image text;

in response to the image text meeting a first malicious promotion condition, obtaining an image text classification result by a text classification model based on the image text, the image text classification result representing a malicious promotion extent of the image text;

in response to the original text information meeting the first malicious promotion condition, obtaining an original text classification result by the text classification model based on the original text information, the original text classification result representing a malicious promotion extent of the original text information; and determining an image recognition result corresponding to the image to be recognized according to the image text classification result or the original text classification result, the image recognition result representing a malicious promotion extent of the image to be recognized.

According to another aspect of this disclosure, a recognition method for multimedia content is provided, including:

obtaining audio data of an audio to be recognized and original text information for the audio to be recognized, the original text information including at least one of comment information and bullet screen information;

performing text recognition processing on the audio data to obtain an audio text;

in response to the audio text meeting a first malicious promotion condition, obtaining an audio text classification result by a text classification model based on the audio text, the audio text classification result representing a malicious promotion extent of the audio text;

in response to the original text information meeting the first malicious promotion condition, obtaining an original text classification result by the text classification model based on the original text information, the original text classification result representing a malicious promotion extent of the original text information; and determining an audio recognition result corresponding to the audio to be recognized according to the audio text classification result or the original text classification result, the audio recognition result representing a malicious promotion extent of the audio to be recognized.

According to another aspect of this disclosure, a recognition apparatus for multimedia content is provided, including a memory operable to store computer-readable instructions and a processor circuitry operable to read the computer-readable instructions. When executing the computer-readable instructions, the processor circuitry is configured to:

obtain target text information and content information in a video, the target text information comprising a title text or an abstract text, and the content information comprising image data or audio data;

perform text recognition processing on the content information to obtain associated text information, the associated text information comprising an image text or an audio text, the image text being obtained by text recognition of the image data, and the audio text being obtained by text recognition of the audio data;

take the target text information meeting a first malicious promotion condition or the associated text information as text content;

obtain, with a text classification model, a target text classification result based on the text content, the target text classification result representing a malicious promotion extent of the text content; and determine a video recognition result corresponding to the video according to the target text classification result, the video recognition result representing a malicious promotion extent of the video.

According to another aspect of this disclosure, a computer device is provided, including: a memory, a processor, and a bus system;

the memory being configured to store a program;

the processor being configured to perform the program in the memory, the processor being configured to perform the method according to the foregoing aspects according to instructions in the program code;

the bus system being configured to connect the memory and the processor, to cause the memory to communicate with the processor.

Another aspect of this disclosure provides a computer-readable storage medium. The computer-readable storage medium stores an instruction, and when the instruction is run on a computer, the computer is enabled to perform the method according to the foregoing aspects.

According to another aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method according to the foregoing aspects.

As can be seen from the foregoing technical solutions, the embodiments of this disclosure have the following advantages:

In an embodiment of this disclosure, a recognition method for multimedia content is provided, including: firstly, obtaining target text information and content information in a video, the target text information including at least one of a title text and an abstract text, and the content information including at least one of image data and audio data; then, performing text recognition processing on the content information to obtain associated text information; when a first malicious promotion condition is met, obtaining a target text classification result by a text classification model; and finally, determining a video recognition result corresponding to the video according to the target text classification result, the video recognition result representing a malicious promotion extent of the video. In this way, the malicious promotion extent of multimedia content is recognized from different aspects. With regard to the media form of video type multimedia content, a more comprehensive grasp for the quality of videos is conducted in the aspects of titles, abstracts, images, audios, etc. to form a more complete recognition policy for video malicious promotion, thereby improving the accuracy of recognizing the video malicious promotion.

DESCRIPTION OF EMBODIMENTS

Figure 1:
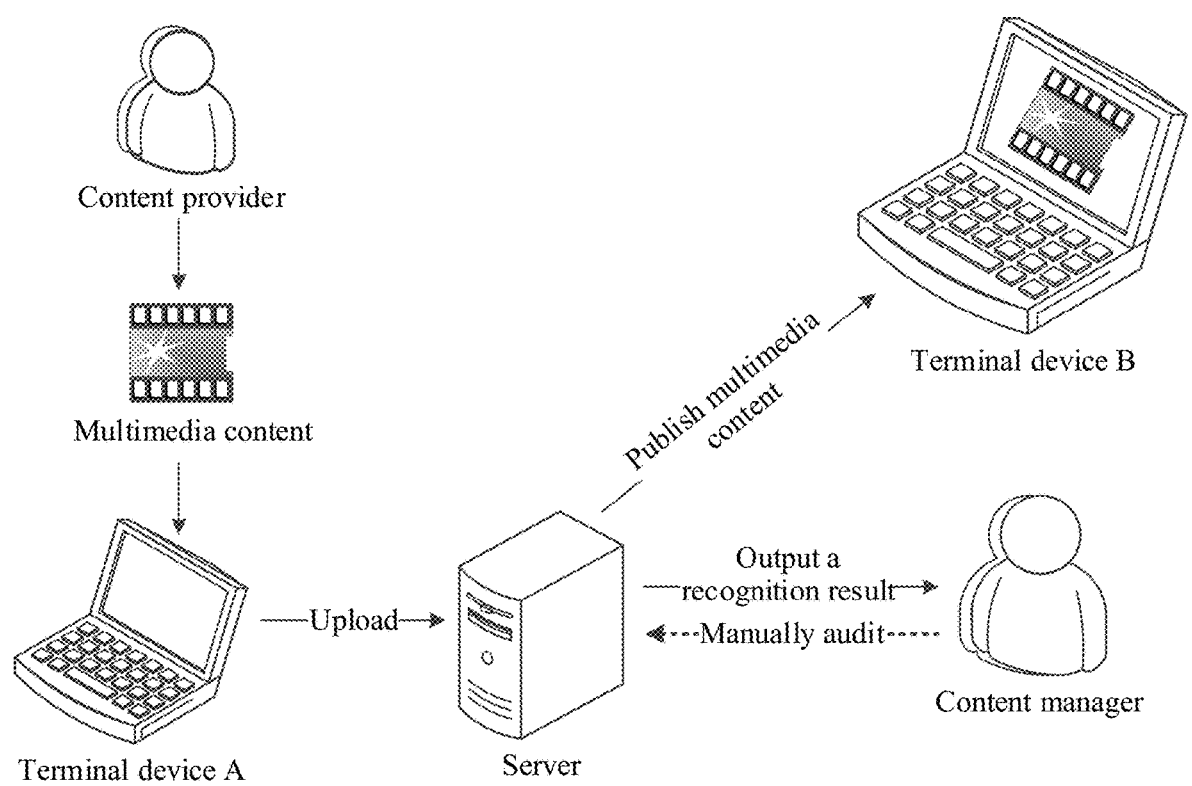
FIG. 1 is a schematic architectural diagram of a recognition system for multimedia content according to an embodiment of this disclosure.

Embodiments of this disclosure provide a recognition method for multimedia content, a related apparatus, a device, and a storage medium. The malicious promotion extent of multimedia content is recognized from different aspects. With regard to the media form of video type multimedia content, a more comprehensive grasp for the quality of videos is conducted in the aspects of titles, abstracts, images, audios, etc. to form a more complete recognition policy for video malicious promotion, thereby improving the accuracy of recognizing the video malicious promotion.

In the specification, claims accompanying drawings of this disclosure, the terms "first", "second", "third", "fourth", "one", "two", and the like (if existing) are intended to distinguish between similar objects rather than describe a specific sequence or a precedence order. It may be understood that the data used in such a way is interchangeable in proper circumstances, so that the embodiments of this disclosure described herein can be implemented in other sequences than the sequence illustrated or described herein. In addition, the terms "comprise", "corresponding to" and any other variants are intended to cover the non-exclusive inclusion. For example, a process, method, system, product, or device that comprises a series of steps or units is not necessarily limited to those expressly listed steps or units, but may comprise other steps or units not expressly listed or inherent to such a process, method, product, or device.

Multimedia content includes texts, images, photos, sounds, animations and movies, as well as interactive functions provided by a program. As a burgeoning comprehensive electronic information technology, the multimedia technology brings directional changes to traditional computer systems, audio devices and video devices, and will have far-reaching influences on mass media. Multimedia computers will accelerate the process of computers entering families and all aspects of society, bringing about a fundamental revolution to people's work, life and entertainment. As the 5th generation mobile networks (5G) open up, more and more multimedia content mainly uploaded by users is released. Even so, a large number of multimedia content for malicious promotion has seriously endangered the development of content ecology.

"Promotion" is to let more people, organizations, etc. know and accept own products, services, technologies, cultures and achievements through media advertisements, so as to achieve the purpose of dissemination and popularization. In massive content scenarios, malicious promotion is to promote contact information in videos, images, voices and texts or advertise products, which more or less affects users who watch the content, thus damaging the content ecology. In particular, the malicious promotion may be subdivided into the following types: medical cosmetology, finance and economics, credit card, stock recommendation, lottery, service startup for moneymaking, medical treatment, geomancy and numerology, antique collection, board game plug-in, pick-up artist (PUA), credit checking and chat record checking, phishing and fake customer service, etc. In recent years, with the continuous development of science and technology, the media form has changed from traditional paper media to electronic, diversified and dynamic media. As an increasingly popular media carrier, videos (especially short videos) have attracted more and more attention. However, the development of multimedia forms such as videos makes a large number of malicious promotion information spread rapidly and widely among people in the form of multimedia, which makes it difficult for people to identify credible information from complex information, thus affecting the normal life order of people and even resulting in unhealthy and unscientific lifestyles.

On this basis, to improve the audit efficiency of multimedia content, reduce the cost of manual auditing and improve the auditing accuracy, this disclosure provides a recognition method for multimedia content, which focuses on the detection and recognition of malicious promotion of the multimedia content (including videos, images, voices, texts, etc.) and is used as a machine policy to assist the manual auditing. This method is applied to a recognition system for multimedia content as shown in FIG. 1. As shown in the figure, the recognition system for multimedia content includes a server and a terminal device and a client is deployed on the terminal device. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data and an AI platform. The terminal device may be a smartphone, a tablet computer, a notebook computer, a handheld computer, a personal computer, a smart television, a smart watch, or the like, but is not limited thereto. The terminal device and the server may be directly or indirectly connected through wired or wireless communication, which is not limited in this disclosure. The quantity of the servers and terminal devices are not limited here.

As an example, in the recognition system for multimedia content as shown in FIG. 1, a content provider (CP) selects local multimedia content in a terminal device A and then uploads the multimedia content to a server; and the server recognizes this content by using the recognition policy provided in this disclosure and outputs a recognition result. A content manager may select whether to further manually audit the recognition result. When it is determined that this multimedia content is not content for malicious promotion, the server publishes such content and other uses can view the published multimedia content through a terminal device B. Conversely, when it is determined that this multimedia content is content for malicious promotion, the server intercepts such content and does not publish it on the Internet.

Figure 2:
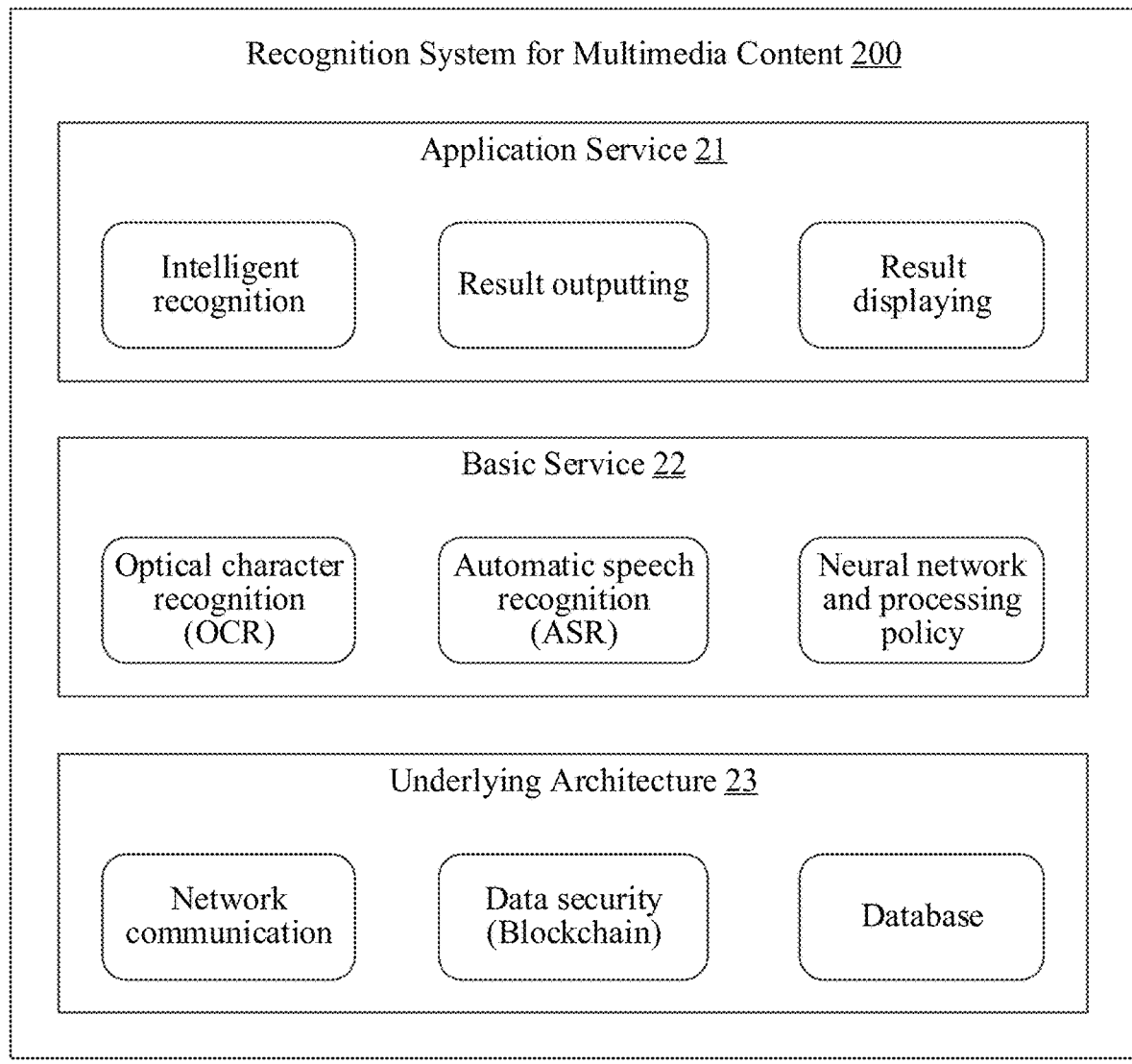
FIG. 2 is a schematic diagram of an application framework of a recognition system for multimedia content according to an embodiment of this disclosure.

On the basis of the recognition system for multimedia content as shown in FIG. 1, reference is made to FIG. 2. FIG. 2 is a schematic diagram of an application framework of a recognition system 200 for multimedia content according to an embodiment of this disclosure. As shown in the figure, the recognition system 200 for multimedia content mainly includes three modules: an application service module 21, a basic service module 22 and an underlying architecture module 23. The underlying architecture module 23 includes network communication, data security, and a database, where the network communication is used for supporting communication between the terminal device and the server; the data security may employ a blockchain technology to perform cochain processing on a recognition result of the multimedia content; and the database stores information related to the multimedia content, such as basic information and behavior information of the content provider. In the basic service module 22, an optical character recognition (OCR) technology is used for recognizing texts in images or videos. An automatic speed recognition (ASR) technology is used for recognizing texts in audios. A neural network and processing policy are used for determining whether multimedia content is content for malicious promotion. In the application service module 21, intelligent recognition refers to calling the neural network and processing policy to determine whether multimedia content is content for malicious promotion, and then outputting a recognition result, thus showing the recognition result to the content manager.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The recognition system for multimedia content provided in this disclosure uses a deep neural network based on semantic transfer in combination with a heuristic policy and dictionary expansion to form a set of combined policies, which improve the accuracy of recognizing malicious titles on the premise of ensuring the recall rate. Deep neural network needs to use large-scale training corpus and be trained by Machine Learning (ML). ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and DL generally include technologies such as an artificial neural network, a belief network, reinforcement learning, transfer learning, inductive learning, and learning from demonstrations.

ML is an important technology in the field of Artificial Intelligence (AI), in which AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer science. AI attempts to understand the essence of intelligence and produce a new kind of intelligent machine that can react in a similar way to human intelligence. AI is to study the design principles and implementation methods of various intelligent machines, so that the machines have the functions of perception, reasoning and decision-making.

AI technology is a comprehensive discipline, covering a wide range of fields, comprising both hardware-level technology and software-level technology. Basic AI technologies generally include technologies such as a sensor, a dedicated AI chip, cloud computing, distributed storage, a big data processing technology, an operating/interaction system, and electromechanical integration. AI software technologies mainly comprise several major directions such as a computer vision (CV) technology, a speech processing technology, a natural language processing technology, and ML/DL.

The recognition system for multimedia content provided in this disclosure implements concurrent processing of a large amount of multimedia content by using cloud computing. Cloud computing is a delivery and use mode of Internet technology (IT) infrastructure, which is used for obtaining required resources through the network in an on-demand and easily extensible way. Furthermore, generalized cloud computing is a delivery and use mode of services, which is used for obtaining required services through the network in an on-demand and easily extensible way. Such services may be related to IT and software, and Internet, and may also be other services. The cloud computing is a fused product of the development of traditional computers and network technologies such as grid computing, distributed computing, parallel computing, utility computing, network storage technologies, virtualization and load balance. With the diversified development of Internet, real-time data stream and connected devices and under the driving of demands of search services, social networks, mobile commerce and open collaboration, the cloud computing has developed rapidly. Different from previous parallel distributed computing, the emergence of cloud computing will drive the revolutionary changes of the whole Internet modes and enterprise management modes in concept.

Cloud computing is a kind of cloud technology, the cloud technology is a hosting technology that unifies a series of resources such as hardware, software, and networks in a wide area network or a local area network to implement storing, processing, and sharing of data. The cloud technology is a collective name of a network technology, an information technology, an integration technology, a management platform technology, an application technology, and the like based on an application of a cloud computing service mode, and may form a resource pool, which is used as required, and is flexible and convenient. The cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and this can only be implemented through cloud computing.

The recognition system for multimedia content provided in this disclosure may also be accessed to a blockchain system, so as to prevent generated information from tampering and be capable of improving the reliability of information sources. A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block comprises information of a batch of network transactions, the information being used for verifying the validity of information of the data block (anti-counterfeiting) and generating a next data block. The blockchain may include an underlying blockchain platform, a platform product service layer, and an application service layer.

The blockchain underlying platform may include processing modules such as a user management module, a basic service module, an intelligent contract module, and an operation management module. The user management module is responsible for management of identity information of all blockchain participants, such as maintenance for generation of public keys and private keys (account management), key management, and maintenance for corresponding relationships between users' real identities and blockchain IP addresses (permission management). In case of authorization, this module is used for supervising and auditing transactions of certain real identities, and providing a rule configuration of risk control (risk control audit). The basic service module is deployed on all blockchain node devices and is used for verifying the validity of service requests and recording all valid requests to a memory after a consensus is reached. For a new service request, this module firstly resolves and authenticates interface adaptation (interface adaptation), and then encrypts service information by using a consensus algorithm (consensus management), transfers encrypted information to a shared account book completely and consistently (network communication), and records and stores the information. The intelligent contract module is responsible for registration and issuing of contracts, contract triggering and contract execution. Developers may define a contract logic through a certain programming language and publish it to blockchain (contract registration), call a key or other events to trigger execution according to the logic of contract terms to complete the contract logic. Meanwhile, the module also provides a contract upgrade and cancellation function. The operations management module is mainly responsible for deployment in a product launch process, configuration modification, contract setting, cloud adaptation, and visual output of real-time status in product running, such as alarming, management of network situations and management of healthy status of node devices.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

Figure 3:
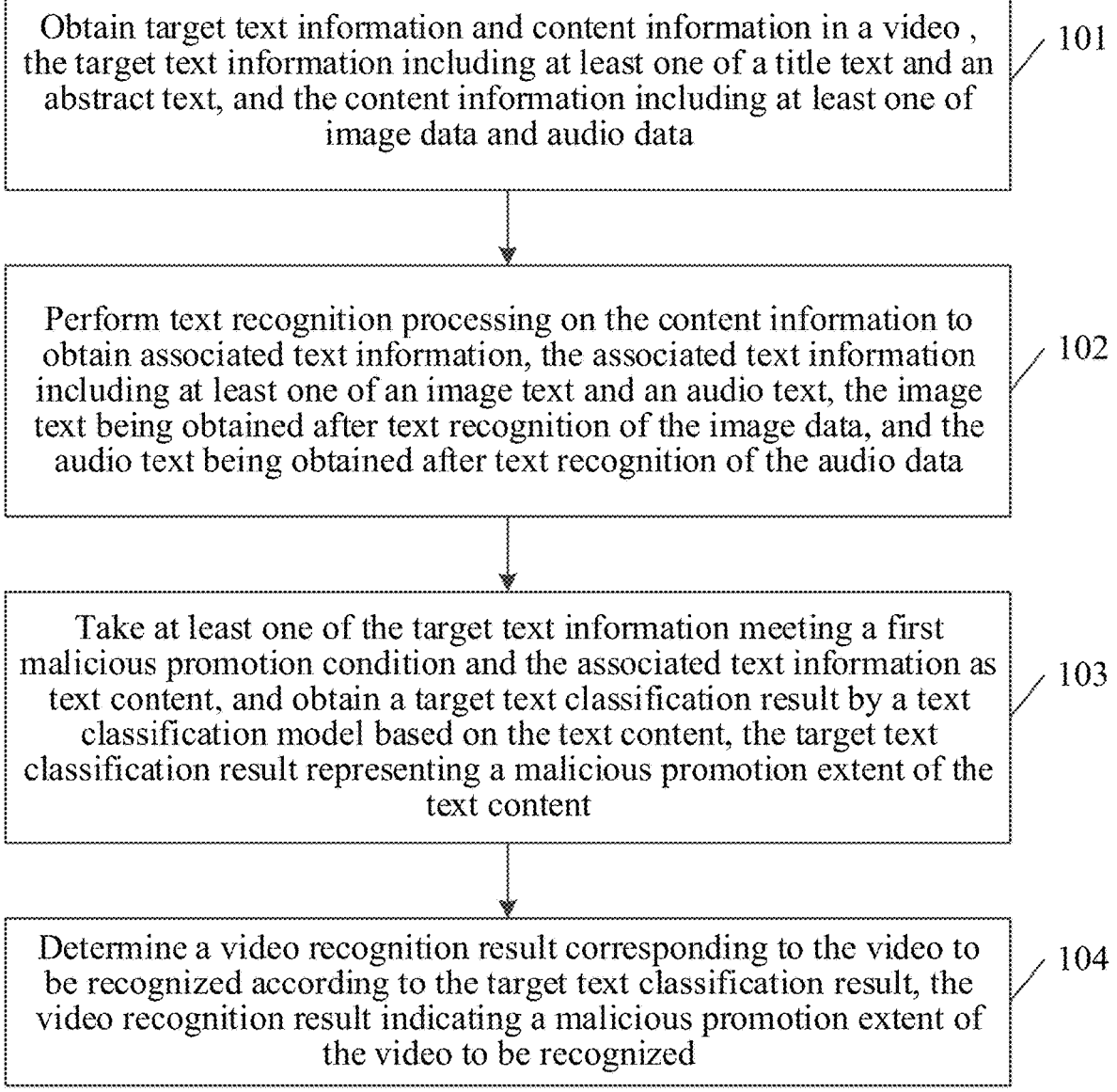
FIG. 3 is a schematic flowchart of a recognition method for multimedia content according to an embodiment of this disclosure.

The recognition method for multimedia content in this disclosure is introduced below with reference to the foregoing introduction. Referring to FIG. 3, an embodiment of the recognition method for multimedia content in the embodiments of this disclosure includes the following steps:

101: Obtain target text information and content information in a video, the target text information including at least one of a title text and an abstract text, and the content information including at least one of image data and audio data.

In this embodiment, a recognition apparatus for multimedia content obtains target text information and content information in a video, where the target text information includes at least one of a title text and an abstract text, and the content information includes at least one of image data and audio data. The title text of the video is a very important information point. In actual, a video title for malicious promotion is sparser than video images or voices for malicious promotion. According to the sampling from whole daily video streaming, the proportion of malicious promotion in the title text is about 4.76 in ten thousand (about 5 in ten thousand).

The recognition apparatus for multimedia content may be deployed on a server, a terminal device, or a recognition system for multimedia content composed of a terminal device and a server, which is not limited herein.

102: Perform text recognition processing on the content information to obtain associated text information, the associated text information including at least one of an image text and an audio text, the image text being obtained after text recognition of the image data, and the audio text being obtained after text recognition of the audio data.

In this embodiment, the recognition apparatus for multimedia content performs text recognition processing on the content information to obtain the associated text information. Technical means used for generating the associated text information will be described below.

Taking text recognition for image data as an example, a computer vision (CV) technology may be used for recognizing a corresponding image text. The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

Taking text recognition for audio data as an example, a speech technology may be used for recognizing a corresponding audio text, where key technologies of the speech technology include ASR, text to speech (TTS), and voiceprint recognition technologies. To make a computer capable of listening, seeing, speaking, and feeling is the future development direction of human-computer interaction, and speech has become one of the most promising human-computer interaction methods in the future.

103: Take at least one of the target text information meeting a first malicious promotion condition and the associated text information as text content, and obtain a target text classification result by a text classification model based on the text content, the target text classification result representing a malicious promotion extent of the text content.

In this embodiment, the recognition apparatus for multimedia content needs to determine whether the target text information and the associated text information meet the first malicious promotion condition. It can be understood that the case of meeting the first malicious promotion condition may be the hit of a keyword or template in a matching library. With regard to the target text information or the associated text information meeting the first malicious promotion condition, the target text classification result may be obtained by inputting the information into a trained text classification model, where the target text classification result may be a binary classification result, for example, "a malicious promotion type" or "not a malicious promotion type". Alternatively, the target text classification result may be a multi-classification result, for example, "a malicious promotion type", "suspected of a malicious promotion type" or "not a malicious promotion type".

Semantic understanding involves natural language processing (NLP), NLP is an important direction in the fields of computer science and AI. NLP studies various theories and methods that enable effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

Figure 4:
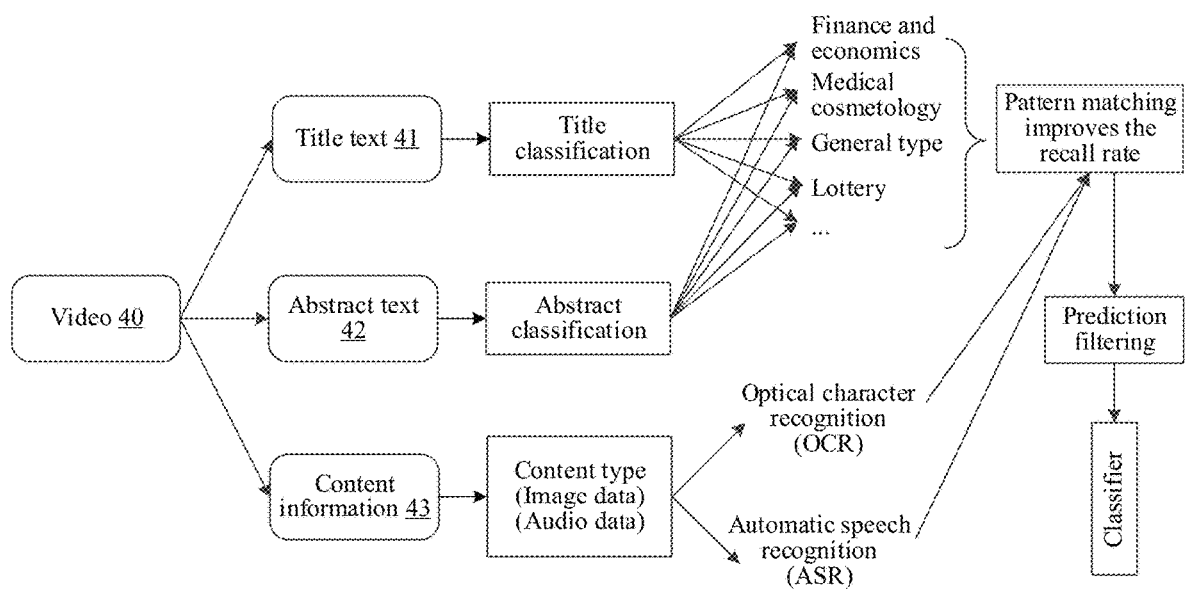
FIG. 4 is a schematic diagram of a recognition framework based on video multi-information source dimensions according to an embodiment of this disclosure.

Specifically, in order to facilitate the comprehension, reference is made to FIG. 4. FIG. 4 is a schematic diagram of a recognition framework based on video multi-information source dimensions according to an embodiment of this disclosure. As shown in the figure, assuming that a video 40 includes a title text 41, an abstract text 42, image data and audio data 43. On this basis, the title text 41 and the abstract text 42 may be classified, respectively. The classification results of the two texts need to be consistent and may be subdivided into types that include, but not limited to: general type, medical cosmetology, finance and economics, credit card, stock recommendation, lottery, service startup for moneymaking, medical treatment, geomancy and numerology, antique collection, board game plug-in, PUA, credit checking and chat record checking, phishing and fake customer service, etc. In these types, most of the promotion forms are to guide attention to contact information and promote product forms or action forms. The focuses of features of each type of videos for malicious promotion are different. As a result, a combinational algorithm of hierarchical policy is formed by multi-source information dimension. The focuses of frameworks in all information sources of videos for malicious promotion are also different. In addition, content information is classified, corresponding image text and audio text are generated based on the OCR and ASR technologies, and the title text and the abstract text are combined as the basis for pattern matching, so as to improve the recall rate.

104: Determine a video recognition result corresponding to the video according to the target text classification result, the video recognition result representing a malicious promotion extent of the video.

In this embodiment, the recognition apparatus for multimedia content determines a video recognition result corresponding to the video according to the target text classification result. For example, when the target text classification result is "a malicious promotion type", the video recognition result of the video is outputted as "a malicious promotion type" and the extent of malicious promotion is the highest. Also for example, when the target text classification result is "suspected of a malicious promotion type", the video recognition result of the video is outputted as "suspected of a malicious promotion type" and the extent of malicious promotion is moderate. Still for example, when the target text classification result is "not a malicious promotion type", the video recognition result of the video is outputted as "not a malicious promotion type" and the extent of malicious promotion is low.

Figure 5:
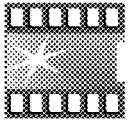
FIG. 5 is a schematic diagram of a recognition scenario of video type multimedia content according to an embodiment of this disclosure.

Specifically, in order to facilitate the comprehension, reference is made to FIG. 5. FIG. 5 is a schematic diagram of a recognition scenario of video type multimedia content according to an embodiment of this disclosure. As shown in the figure, recognition results of different videos may be shown to the content manager after video recognition. In one aspect, a video recognition platform may directly remove or delete videos of "a malicious promotion type". In another aspect, the content manager may also further view specific information of the videos to manually check the accuracy of output results. The videos for malicious promotion involve in all aspects of social life of human and have various topics. Compared with common videos, such videos have obvious partial clip orientation.

In an embodiment of this disclosure, a recognition method for multimedia content is provided. In this way, the malicious promotion extent of multimedia content is recognized from different aspects. With regard to the media form of video type multimedia content, a more comprehensive grasp for the quality of videos is conducted in the aspects of titles, abstracts, images, audios, etc. to form a more complete recognition policy for video malicious promotion, thereby improving the accuracy of recognizing the video malicious promotion.

In an exemplary implementation, based on the embodiment corresponding to FIG. 3, in another exemplary embodiment provided in the embodiments of this disclosure, content information includes image data;

performing text recognition processing on the content information to obtain associated text information may specifically include:

performing framing processing on the image data included in the video to obtain K video frames, where K is an integer greater than or equal to 1;

obtaining L video frames from the K video frames according to a preset frame rate, the L being an integer greater than or equal to 1 and less than the K;

performing OCR processing on each video frame in the L video frames to obtain a text recognition result of each video frame, the text recognition result including captions and coordinate information corresponding to the captions;

performing deduplication on the captions in each video frame of the L video frames according to the coordinate information corresponding to the captions; and taking the captions after deduplication in each video frame as the image text in the associated text information.

In this embodiment, a method for performing OCR recognition on image data is introduced. In addition to title texts of videos for malicious promotion, image data of such videos is also an important information source. For the image data, L video frames may be obtained from K video frames according to a preset frame rate (for example, one frame per second). captions and coordinate information thereof in each video frame are extracted by using the OCR technology.

Figure 6:
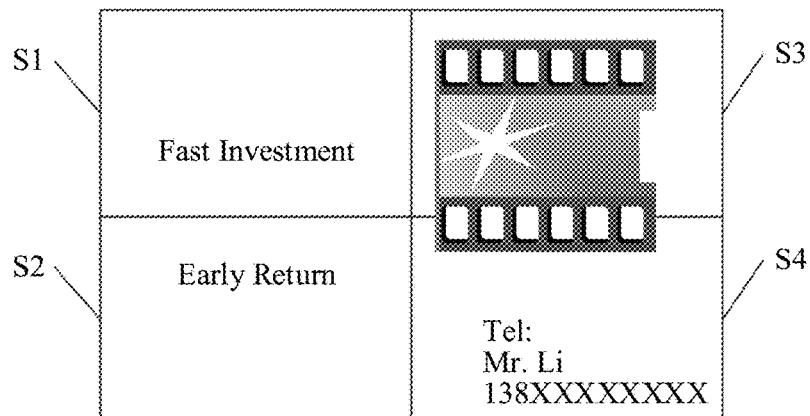
FIG. 6 is a schematic diagram of caption deduplication based on coordinate information according to an embodiment of this disclosure.

Specifically, a process for deduplicating captions based on coordinate information will be described below in combination with FIG. 6. Reference is made to FIG. 6. FIG. 6 is a schematic diagram of caption deduplication based on coordinate information according to an embodiment of this disclosure. As shown in the figure, taking a frame as an example, it is assumed that this frame is divided into four blocks, that is, a block indicated by S1, a block indicated by S2, a block indicated by S3 and a block indicated by S4. The lower left corner may be set as the origin of coordinates, that is, each block may be represented by horizontal and vertical coordinates. In this case, the caption "Fast Investment" will be extracted from Block S1. When the caption "Fast Investment" is also extracted from Block S1 in the next frame, this caption is deduplicated to obtain complete and clean information. After the L video frames are deduplicated, an image text is obtained.

It can be seen that the coordinate information of the caption in each video frame is very important during implementation, which is used for helping locate or aggregate content which may belong to one piece of information.

Secondly, in an embodiment of this disclosure, a method for performing OCR recognition on image data is provided. Through the aforementioned method, firstly, frame extraction is performed on the image data of a video, and a recognized image text is matched with a template. In this way, the dimension of recognizing videos for malicious promotion is increased, thereby facilitating the improvement of the accuracy of recognizing the video malicious promotion.

In an exemplary implementation, based on the embodiment corresponding to FIG. 3, in another exemplary embodiment provided in the embodiments of this disclosure, content information includes audio data;

performing text recognition processing on the content information to obtain associated text information may specifically include:

performing framing processing on the audio data included in the video to obtain T audio frames, the T being an integer greater than or equal to 1;

performing feature extraction processing on each audio frame of the T audio frames to obtain an audio feature vector corresponding to each audio frame; and determining an audio text in the associated text information based on the audio feature vector corresponding to each audio frame.

In an exemplary implementation, phoneme information may be outputted by an acoustic model based on the audio feature vector corresponding to each audio frame; and the audio text in the associated text information is outputted by a language model based on the phoneme information.

In this embodiment, a method for performing ASR recognition on audio data is introduced. In addition to title texts of videos for malicious promotion, audio data of such videos is also an important information source. For the audio data, framing processing may be performed on the audio data included the video to obtain T audio frames. Then, in a coding part, feature extraction processing is performed on each audio frame of the T audio frames to obtain an audio feature vector corresponding to each audio frame. In a decoding part, phoneme information may be outputted by an acoustic model based on the audio feature vector corresponding to each audio frame; and finally, an audio text is outputted by a language model based on the phoneme information.

Specifically, in view of the fact that there may be background music or strong dialect accent in audio data, it is often difficult to correctly identify an audio text. As a result, this application may select to not perform ACR processing on such audio data or not perform subsequent template matching.

Secondly, in an embodiment of this disclosure, a method for performing ASR recognition on audio data is provided. Through the aforementioned method, firstly, audio data of a video is recognized, and then a recognized audio text is matched with a template. In this way, the dimension of recognizing videos for malicious promotion is increased, thereby facilitating the improvement of the accuracy of recognizing the video malicious promotion.

In an exemplary implementation, based on the foregoing embodiment corresponding to FIG. 3, in another exemplary embodiment provided in the embodiments of this disclosure, the method may further include:

when the title text successfully matches with a template in a matching library and fails to match with information in a whitelist, determine that the title text meets the first malicious promotion condition and the target text information meets the first malicious promotion condition;

when the abstract text successfully matches with a template in the matching library and fails to match with information in the whitelist, determine that the abstract text meets the first malicious promotion condition and the target text information meets the first malicious promotion condition;

when the image text successfully matches with a template in the matching library and fails to match with information in the whitelist, determine that the image text meets the first malicious promotion condition and the associated text information meets the first malicious promotion condition; and when the audio text successfully matches with a template in the matching library and fails to match with information in the whitelist, determine that the audio text meets the first malicious promotion condition and the associated text information meets the first malicious promotion condition.

In this embodiment, a method for determining a malicious promotion type by combining template matching and "rejection policy" is introduced. It can be seen from the aforementioned embodiments that situations meeting the first malicious promotion condition include the hit of a keyword or template in the matching library, and furthermore, may include the missing of any information in the whitelist. This is because that if only the template or keyword in the matching library is hit, some multimedia content that is not of the malicious promotion may be recalled. Therefore, the "rejection policy" is further set (that is, refusing to recognize information appearing in the whitelist).

Specifically, the title text will be described below as an example. It can be understood that a processing method for the abstract text, image text and audio text is similar to that for the title text as described in the other embodiments herein. The title text of the video is a short text. On the basis of the feature of each type of titles for malicious promotion, a matching library based on keywords and templates is maintained for each divided type (for example, general type, medical cosmetology and finance and economics). According to the analysis of videos for malicious promotion accumulated through audit, each type of title texts of such videos may be summarized to obtain relevant keywords or templates in a very long period (unless there is obvious change of ideology or mainstream media form). The keywords or templates associated with the titles for malicious promotion are of a necessary but insufficient condition for malicious promotion of video titles. In other words, a title text hit by the matching library may be not a real title for malicious promotion, but the real title for malicious promotion will definitely be hit by the matching library. Therefore, there is a need of maintaining a full matching library based on keywords and templates, and paying attention to a recall rate for a policy module of the video titles. In the case of ensuring the recall first, in order to improve the accuracy as much as possible, the "rejection policy" is also designed in this disclosure.

Among a large amount of multimedia content recalled based on title texts (for example, videos to be recognized), some content is related to the promotion of government affairs by the state or local government departments, or social news, which cannot be simply determined as malicious promotion. For this case, a policy algorithm for government propaganda and social news is designed in the "rejection policy". The core of this policy algorithm is to perform parallel judgment on multiple features by matching. For example, the title text of a video is "Everyone is responsible for environmental protection", in which "environmental protection" hits the whitelist. As a result, the title text does not meet a first malicious promotion condition, that is, target text information does not meet the first malicious promotion condition either. Similarly, there is also a need of determining whether the abstract text, image text and audio text hit the whitelist, thereby obtaining a result of determining whether the first malicious promotion condition is met.

A lot of collected resources in aspects of government affairs and news may be added to the whitelist. For example, the names of functional propaganda units of relevant government departments and the names of provinces, cities and counties may be crawled and sorted out. These resources may be used as keywords of the whitelist to perform expected rough recall of government propaganda trainings, which facilitates further manual annotation based on classification labels. Meanwhile, there may be data enhancement in a classifier, which is used for generating a large amount of samples for training in supervised training. In the algorithm of social news, title corpora of negative news may also be used for carrying out the supervised training.

Since the full matching library based on keywords and templates is very important, multiple policies (for example, manual participation or automatic device adjustment) are set to ensure the diversity and real-time updating of the matching library.

Secondly, in an embodiment of this disclosure, a method for determining a malicious promotion type by combining template matching and "rejection policy" is provided. Through the aforementioned method, videos that may have malicious promotion may be found based on the template matching, and videos that are included in the whitelist may be filtered based on the rejection policy. Therefore, the accuracy of recalling videos may be improved.

In an exemplary implementation, on the basis of the embodiment corresponding to FIG. 3 above, in another exemplary embodiment provided by the embodiments of this disclosure, obtaining a target text classification result by a text classification model based on at least one of target text information and associated text information may specifically include:

when the title text meets the first malicious promotion condition, obtain a title text classification result by the text classification model based on the title text;

when the abstract text meets the first malicious promotion condition, obtain an abstract text classification result by the text classification model based on the abstract text;

when the image text meets the first malicious promotion condition, obtain an image text classification result by the text classification model based on the image text; and when the audio text meets the first malicious promotion condition, obtain an audio text classification result by the text classification model based on the audio text.

In this embodiment, a predication method for accessing to a text classification model is introduced. It can be seen from the aforementioned embodiments, in a case of determining that texts meet the first malicious promotion condition, one text classification model (i.e., a classifier) may also be accessed after matching and recalling in order to improve the accuracy of recognizing videos for malicious promotion. This attempts to sort out title texts for malicious promotion, abstract texts for malicious promotion, image texts for malicious promotion, and audio texts for malicious promotion from a large amount of recalled videos as much as possible.

Figure 7:
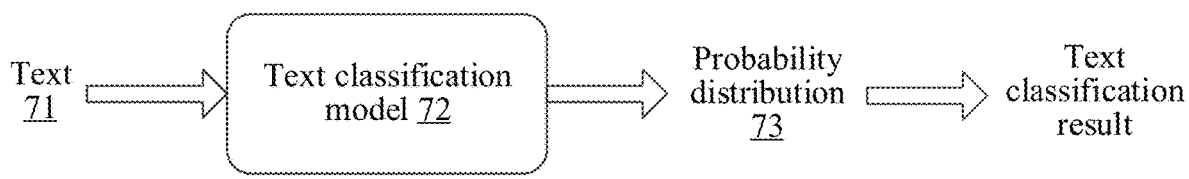
FIG. 7 is a schematic diagram of a text classification result outputted based on a single classifier according to an embodiment of this disclosure.

Specifically, in order to facilitate the comprehension, reference is made to FIG. 7. FIG. 7 is a schematic diagram of a text classification result outputted based on a single classifier according to an embodiment of this disclosure. As shown in the figure, any one text 71 (for example, title text, abstract text, image text or audio text) is inputted into the text classification model 72 and the probability distribution 73 is outputted by the text classification model 72.

As an example, taking a binary classification output result as an example, after the title text is inputted into the text classification model, the probability distribution outputted by the model is (0.1, 0.9), where 0.1 represents the probability of "a malicious promotion type" and 0.9 represents the probability of "not a malicious promotion type". As a result, the classification result of the title text is "not a malicious promotion type".

As an example, taking a multi-classification output result as an example, after the title text is inputted into the text classification model, the probability distribution outputted by the model is (0.1, 0.6, 0.3), where 0.1 represents the probability of "a malicious promotion type", 0.6 represents the probability of "suspected of a malicious promotion type" and 0.3 represents the probability of "not a malicious promotion type". As a result, the classification result of the title text is "suspected of a malicious promotion type".

Methods for obtaining an abstract text classification result, an image text classification result and an audio text classification result are similar to a method for obtaining the title text classification result as described in other embodiments herein.

The text classification model is obtained by annotating a certain amount of samples through manual annotation and performing supervised training on the samples. Based on the choose of text classification model, feature extraction and feature classifiers may be used, or text classification based on deep learning, which is popular in this industry in recent years, may be used. In general, the text classification based on deep learning may also be divided into a model based on recurrent neural network (RNN), a model based on convolutional neural networks (CNNs), a classification model based on transformer-encoder, and a combination of some of them. In addition, there may be some variants such as deep mixing models based on the three models above, deep models based on attention, and deep models based on memory networks. The deep model used for text classification is a model based on transformer-encoder, which is basically pre-trained in two stages. On this basis, some simple domain adaptation modifications are performed, including, but not limited to, secondary pre-training performed on a trained model, secondary pre-training performed on large-scale unsupervised domain corpus, model compression performed by model distillation, multi-model result fusion by stacking, etc.

Three text classification models will be combined below for realizing semantic analysis.

1. A text classification model based on term frequency-inverse document frequency (TF-IDF).

During the semantic analysis for a text by the text classification model, firstly, the text (for example, title text, abstract text, image text or audio text) is pre-processed and is regarded as a document. After that, a document representation method that is commonly used in the fields of information retrieval and natural language processing is used, such as a bag-of-word model. Unweighted one-hot representation or weighted TF-IDF representation is used for representing this document. Usually, the order of words appearing in a text unit is not taken into account in such scenario of this bag-of-word model. The one-hot representation is 0/1 representation of a word and the weight of this word is not taken into account. The TF-IDF representation is to represent the word by using a TF-IDF score calculated by each word. With regard to each text unit, term frequency (TF) is the frequency of a term appearing in the document. In addition, with regard to the calculation of relevance, the distinguishing capability for some words (such as auxiliary words) is very week. For example, almost text units may contain the word "attention" which cannot embody the semantic difference between the text units. For this reason, a concept of inverse document frequency (IDF) is introduced, representing the reciprocal of the frequency of words appearing in all documents.

The IDF scores of high frequency words which cannot be distinguished in the text units are very low. In combination with TF-IDF, the importance degree of text words may be represented very well. When a certain word does not appear in the current text units, the component value corresponding to this word is 0. After the text units are converted into unweighted or weighted bag-of-word representation, a vector space model (VSM) may be used for modeling a relationship between the text units, such as computing similarity or semantic relevance. The most typical method can be used for calculating the cosine similarity between text unit vectors. When the similarity between two text units is higher, their subjects are more similar.

2. A text classification model based on deep learning.

After manual annotation, some promotion samples are classified according to a text classification process in NLP in a supervised manner. Classification models may be roughly divided into two categories. One is a traditional method, which firstly performs feature extraction (that is, uses feature engineering) and incorporates a classifier to extracted features, such as logistic regression, linear regression, a support vector machine (SVM), adaptive boosting (Adaboost) and extreme gradient boosting (XGboost). The other method is a short text classification model based on deep learning, which is RNN, CNN or a variant based on RNN or CNN. A convolution layer is essentially a feature extraction layer, and a hyper-parameter may be used for specifying the number of convolution kernels. Since the convolution kernel covers a sliding window, features of n-gram fragments are extracted by the convolution kernel, and the value of n determines the distance for capturing the features. There is no dependency relationship for relative positions between the sliding windows, so the parallelism degree of CNN is very high, which is also an advantage of CNN.

3. A text classification model based on transformer-encoder.

Actually, an encoder of the transformer-encoder is a feature extractor which has very good performance and may perform parallel computing, and is formed by stacking via a self-attention mechanism. The self-attention mechanism allows each word to be associated with any other words and then be integrated into an embedded vector. Therefore, compared with CNN, this mechanism has the advantage that the distance for extracting local features is infinitely free and is not influenced by the convolution kernels. At the same time, a lot of experiments prove that the capability of extracting semantic features of the transformer-encoder is higher than that of RNN and CNN. In the aspect of long-distance feature capturing, the transformer-encoder is slightly better than RNN and RNN is better than CNN. In the aspect of parallel computing efficiency, the transformer-encoder is slightly better than CNN and CNN is better than RNN.

Thirdly, in an embodiment of this disclosure, a predication method for accessing to a text classification model is provided. Through the aforementioned method, since the text classification model is a single classifier, a target text classification result (including a title text classification result, an abstract text classification result, an image text classification result and an audio text classification result) may be directly predicted. In addition, multiple predication branches may be processed in parallel, that is, multiple multimedia content may be classified simultaneously, thereby improving the classification prediction efficiency.

In an exemplary implementation, on the basis of the embodiment corresponding to FIG. 3 above, in another exemplary embodiment provided by the embodiments of this disclosure, obtaining a target text classification result by a text classification model based on the text content may specifically include:

when the title text meets the first malicious promotion condition, based on the abstract text, obtain N title text classification sub-results by N sub-classification models included in the text classification model, respectively, and determine a title text classification result according to the N title text classification sub-results, each title text classification sub-result corresponding to one malicious promotion type;

when the abstract text meets the first malicious promotion condition, based on the abstract text, obtain N abstract text classification sub-results by N sub-classification models included in the text classification model, respectively, and determine an abstract text classification result according to the N abstract text classification sub-results, each abstract text classification sub-result corresponding to one malicious promotion type;

when the image text meets the first malicious promotion condition, based on the image text, obtain N image text classification sub-results by N sub-classification models included in the text classification model, respectively, and determine an image text classification result according to the N image text classification sub-results, each image text classification sub-result corresponding to one malicious promotion type; and when the audio text meets the first malicious promotion condition, based on the audio text, obtain N audio text classification sub-results by N sub-classification models included in the text classification model, respectively, and determine an audio text classification result according to the N audio text classification sub-results, each audio text classification sub-result corresponding to one malicious promotion type.

In this embodiment, another predication method for accessing to a text classification model is introduced. It can be seen from the aforementioned embodiments, in a case of determining that texts meet the first malicious promotion condition, multiple sub-classification models may also be incorporated after matching and recalling (i.e., multiple sub-classification models commonly form the text classification model) in order to improve the accuracy of recognizing videos for malicious promotion. This attempts to sort out title texts for malicious promotion, abstract texts for malicious promotion, image texts for malicious promotion, and audio texts for malicious promotion from a large amount of recalled videos as much as possible.

Figure 8:
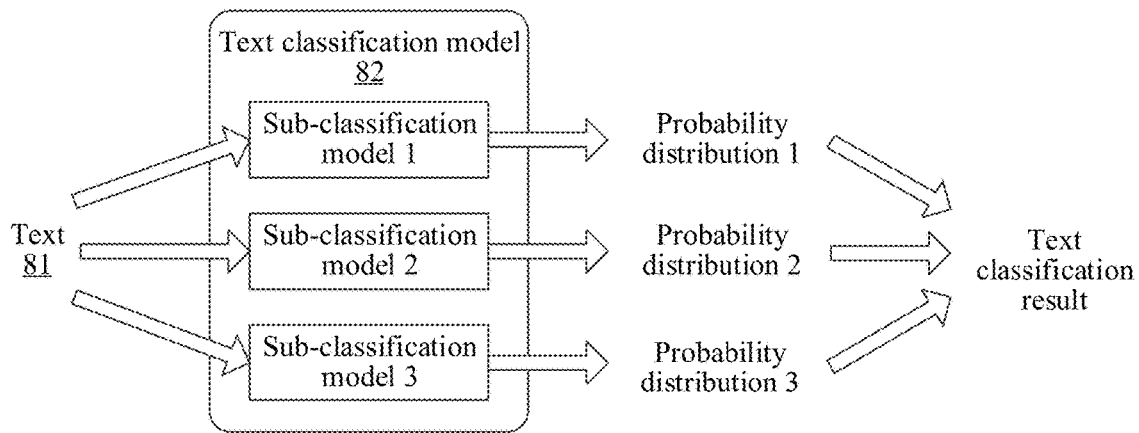
FIG. 8 is a schematic diagram of a text classification result outputted based on a plurality of classifiers according to an embodiment of this disclosure.

Specifically, in order to facilitate the comprehension, reference is made to FIG. 8. FIG. 8 is a schematic diagram of a text classification result outputted based on a plurality of classifiers according to an embodiment of this disclosure. As shown in the figure, assuming that the text classification model 82 includes three sub-classification models (that is, assuming that N is equal to 3), each sub-classification model corresponds to one type, for example, the sub-classification model 1 is a classification model of "stock recommendation", the sub-classification model 2 is a classification model of "medical treatment", and the sub-classification model 3 is a classification model of "credit card". Any one text 81 (for example, title text, abstract text, image text or audio text) is inputted into a different sub-classification model and the probability distribution is outputted by the sub-classification model.

As an example, taking a binary classification output result as an example, after the title text is inputted into the sub-classification model 1 included in the text classification model, the probability distribution outputted by the sub-classification model 1 is (0.1, 0.9), where 0.1 represents the probability of "a stock recommendation type" and 0.9 represents the probability of "not a stock recommendation type". After the title text is inputted into the sub-classification model 2 included in the text classification model, the probability distribution outputted by the sub-classification model 2 is (0.9, 0.1), where 0.9 represents the probability of "a medical treatment type" and 0.1 represents the probability of "not a medical treatment type". After the title text is inputted into the sub-classification model 3 included in the text classification model, the probability distribution outputted by the sub-classification model 3 is (0.4, 0.6), where 0.4 represents the probability of "a credit card type" and 0.6 represents the probability of "not a credit card type". On this basis, the probability of "a medical treatment type" is the highest. As a result, the title text classification result is "medical treatment type malicious promotion".

As an example, taking a multi-classification output result as an example, after the title text is inputted into the sub-classification model 1 included in the text classification model, the probability distribution outputted by the sub-classification model 1 is (0.1, 0.6, 0.3), where 0.1 represents the probability of "a stock recommendation type", 0.6 represents the probability of "suspected of a stock recommendation type" and 0.3 represents the probability of "not a stock recommendation type". After the title text is inputted into the sub-classification model 2 included in the text classification model, the probability distribution outputted by the sub-classification model 2 is (0.8, 0.1, 0.1), where 0.8 represents the probability of "a medical treatment type", 0.1 represents the probability of "suspected of a medical treatment type" and 0.1 represents the probability of "not a medical treatment type". After the title text is inputted into the sub-classification model 3 included in the text classification model, the probability distribution outputted by the sub-classification model 3 is (0.4, 0.4, 0.2), where 0.4 represents the probability of "a credit card type", 0.4 represents the probability of "suspected of a credit card type", and 0.2 represents the probability of "not a credit card type". On this basis, the probability of "a medical treatment type" is the highest. As a result, the title text classification result is "medical treatment type malicious promotion".

Methods for obtaining an abstract text classification result, an image text classification result and an audio text classification result are similar to a method for obtaining the title text classification result as described in the other embodiments herein.

Thirdly, in an embodiment of this disclosure, another predication method for accessing to a text classification model is provided. Through the aforementioned method, since the text classification model includes a plurality of classifiers, a plurality of text classification sub-results (including a title text classification sub-result, an abstract text classification sub-result, an image text classification sub-result and an audio text classification sub-result) may be predicted. Finally, a target text classification result is determined based on the plurality of text classification sub-results. Therefore, more detailed classification may be performed on multimedia content and subsequent recognition may be performed for specific types, thereby improving the recognition accuracy.

In an exemplary implementation, based on the foregoing embodiment corresponding to FIG. 3, in another exemplary embodiment provided in the embodiments of this disclosure, the method may further include:

when the content information includes the image data, obtain an image classification result by an image classification model based on the image data, the image classification result representing a malicious promotion extent of the image data;

determining a video recognition result corresponding to the video according to the target text classification result may specifically include:

determine a video recognition result corresponding to the video according to the target text classification result and the image classification result.

In this embodiment, a method for determining malicious promotion with the assistance of a CV technology is introduced. On the video content level, the method for determining whether videos are videos for malicious promotion is divided into a "whitelist judgment" policy algorithm and a "blacklist judgment" policy algorithm based on the accumulation of capabilities of recognizing low-quality videos in combination with video content features.

Specifically, after framing processing of the image data, divided video frames may be inputted into the image classification model; and the image classification model is used for recognizing regions of interest (ROIs) in the video frames, such as a QR code, a trend chart or a station caption. The image classification model includes but not limited to a you only look once (YOLO) model, a single shot multibox detector (SSD), etc., which are not limited herein.

On this basis, a video recognition result corresponding to a video is determined according to a target text classification result and an image classification result. For example, when the target text classification result is "a malicious promotion type" and the image classification result is "a malicious promotion type", the video recognition result corresponding to the video is "a malicious promotion type". Also for example, when the target text classification result is "a malicious promotion type" and the image classification result is "not a malicious promotion type", the video recognition result corresponding to the video is "suspected of a malicious promotion type". Still for example, when the target text classification result is "not a malicious promotion type" and the image classification result is "a malicious promotion type", the video recognition result corresponding to the video is "suspected of a malicious promotion type". Yet for example, when the target text classification result is "not a malicious promotion type" and the image classification result is "not a malicious promotion type", the video recognition result corresponding to the video is "not a malicious promotion type".

Secondly, in an embodiment of this disclosure, a method for determining malicious promotion with the assistance of a CV technology is provided. Through the aforementioned method, firstly, the image data in a video is recognized to obtain an image classification result; and then, whether the video is of the malicious promotion type is determined by combining the image classification result and the target text classification result obtained after text recognition. In this way, policies in all source information dimensions are combined together to achieve complementary effects.

In an exemplary implementation, on the basis of the embodiment corresponding to FIG. 3 above, in another exemplary embodiment provided by the embodiments of this disclosure, determining a video recognition result corresponding to the video according to the target text classification result and the image classification result may specifically include:

when the image classification result represents that the video includes an information code and the target text classification result meets a second malicious promotion condition, determine that a video recognition result corresponding to the video is a video for malicious promotion;

when the image classification result represents that the video includes a trend chart and the target text classification result meets the second malicious promotion condition, determine that a video recognition result corresponding to the video is a video for malicious promotion; and when the image classification result represents that the video is of a preset video type, determine that a video recognition result corresponding to the video is a video not for malicious promotion.

In this embodiment, a method for implementing assisted "blacklist judgment" and direct "whitelist judgment" by using a CV technology is introduced. As an assisted feature for determining whether a video is a video for malicious promotion, "blacklist judgment" does not determine this video as the one for malicious promotion. The "blacklist judgment" policy algorithm includes information code (such as QR code and bar code) recognition, trend charts of recommended stocks, etc. The "whitelist judgment" policy algorithm includes a government propaganda video policy, a news propaganda video policy, etc.

Specifically, when the "blacklist judgment" policy algorithm determines that the video includes an information code and the target text classification result meets a second malicious promotion condition, it is directly determined that the video is a video for malicious promotion, that is, the video recognition result is "a malicious promotion type". When the "blacklist judgment" policy algorithm determines that the video includes a trend chart and the target text classification result meets the second malicious promotion condition, it is directly determined that the video is a video for malicious promotion, that is, the video recognition result is "a malicious promotion type". When the "whitelist judgment" policy algorithm determines that the video is of a preset video type (such as a government propaganda video or a news propaganda video), it is directly determined that the video is a video not for malicious promotion, that is, the video recognition result is "not a malicious promotion type".

Situations meeting the second malicious promotion condition include, but not limited to: the target text classification result is "a malicious promotion type" or "suspected of a malicious promotion type", or the malicious promotion type is divided into five risk levels, and the target text classification result is "Level 3" or above, which are not limited herein.

Figure 9:
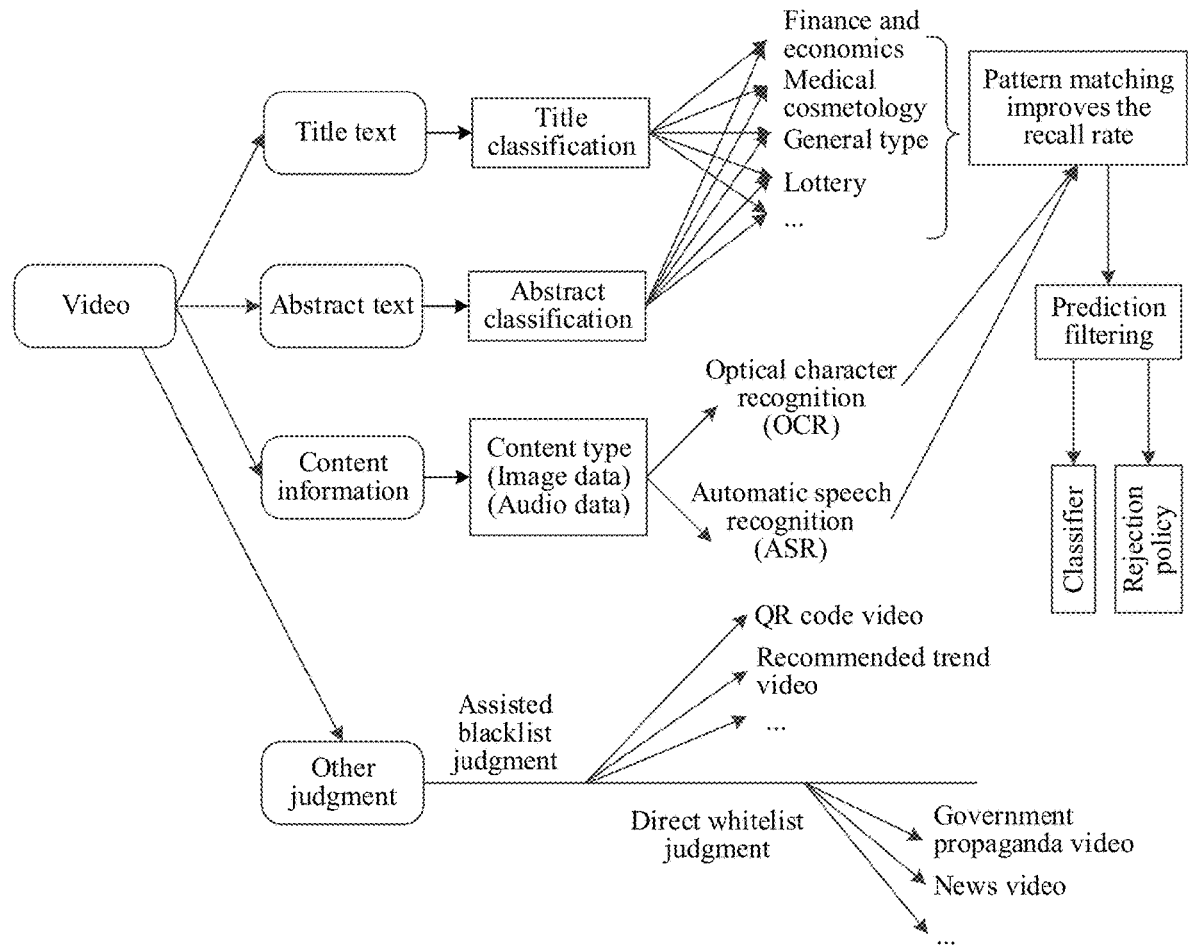
FIG. 9 is another schematic diagram of a recognition framework based on video multi-information source dimensions according to an embodiment of this disclosure.

In order to facilitate the comprehension, reference is made to FIG. 9. FIG. 9 is another schematic diagram of a recognition framework based on video multi-information source dimensions according to an embodiment of this disclosure. As shown in the figure, in one "blacklist judgment" policy algorithm, whether there is an information code exceeding 2 seconds for promoting contact information or products in an extracted image of the video is determined by using a CV algorithm. In the other "blacklist judgment" policy algorithm, whether the video is a recommended stock trend video is determined. The obvious feature of such video is that extracted images of the video usually include a stock trend chart showing for a longer time to recommend stocks in a lecture manner or explain a trend. The "whitelist judgment" policy algorithm includes a government propaganda video policy, a news propaganda video policy, etc. The government propaganda video policy is to determine whether a video is a government propaganda video of the state or local government. Such video has certain promotion attributes, but is not a video for malicious promotion. Similarly, the news propaganda video policy is to determine whether a video is a long-length propaganda video. News propaganda clips of such video are often mismatched during prerequisite template matching. In this case, whitelist judgment is also required for this video.

Most of these policy algorithms use a classification means of supervised training. Different from the assisted feature of the "blacklist judgment" policy, the "whitelist judgment" policy is a direct whitelist judgment policy. When one of the "whitelist judgment" policies is hit by a video, such video is automatically classified as a video not for malicious promotion.

Secondly, in an embodiment of this disclosure, a method for implementing assisted "blacklist judgment" and direct "whitelist judgment" by using a CV technology is provided. Through the aforementioned method, on the video content level, the "whitelist judgment" policy algorithm and the "blacklist judgment" policy algorithm are introduced based on the accumulation of capabilities of recognizing low-quality videos in combination with video content features. When one of the "whitelist judgment" policy algorithms is hit by a video, such video is automatically classified as a video not for malicious promotion. When the "blacklist judgment" policy algorithm is hit, that is, as an assisted feature for determining whether a video is a video for malicious promotion, such video is not directly determined as the one for malicious promotion.

In an exemplary implementation, based on the foregoing embodiment corresponding to FIG. 3, in another exemplary embodiment provided in the embodiments of this disclosure, the method may further include:

obtain original text information for the video, the original text information including at least one of comment information and bullet screen information;

when the original text information meets the first malicious promotion condition, obtaining an original text classification result by the text classification model based on the original text information, the original text classification result representing a malicious promotion extent of the original text information; and determining a video recognition result corresponding to the video according to the target text classification result may specifically include:

determine a video recognition result corresponding to the video according to the target text classification result and the original text classification result; or determine a video recognition result corresponding to the video according to the target text classification result, the original text classification result and an image classification result, the image classification result being obtained by an image classification model based on the image data and representing a malicious promotion extent of the image data.

In this embodiment, a method for supplementary recognition by combining comment information and bullet screen information is introduced. Videos for malicious promotion are determined with the aid of some added related feature information of videos, where one more targeted feature of non-video content is user generated content (UGC).

Figure 10:
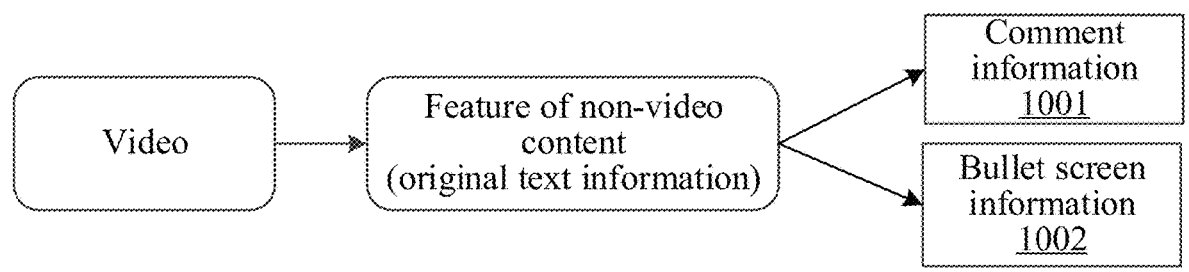
FIG. 10 is a schematic diagram of a recognition framework based on non-content level feature supplementation according to an embodiment of this disclosure.

Specifically, in order to facilitate the comprehension, reference is made to FIG. 10. FIG. 10 is a schematic diagram of a recognition framework based on non-content level feature supplementation according to an embodiment of this disclosure. As shown in the figure, UGC is original text information that includes one of comment information 1001 and bullet screen information 1002. In addition, not all videos to be recognized include the original text information. However, when the original text information is included, whether the content is used for malicious promotion may be detected. For example, when the original text information meets the first malicious promotion condition, an original text classification result is obtained by the text classification model.

As an example, a video recognition result corresponding to the video may be determined according to the target text classification result and the original text classification result. For example, when the target text classification result is "a malicious promotion type" and the original text classification result is "a malicious promotion type", the video recognition result corresponding to the video is "a malicious promotion type". Also for example, when the target text classification result is "a malicious promotion type" and the original text classification result is "not a malicious promotion type", the video recognition result corresponding to the video is "suspected of a malicious promotion type".

As an example, a video recognition result corresponding to the video may be determined according to the target text classification result, the original text classification result, and the image classification result. For example, when the target text classification result is "a malicious promotion type", the original text classification result is "a malicious promotion type" and the image classification result is "a malicious promotion type", the video recognition result corresponding to the video is "a malicious promotion type". Also for example, when the target text classification result is "a malicious promotion type", the original text classification result is "not a malicious promotion type" and the image classification result is "a malicious promotion type", the video recognition result corresponding to the video is "suspected of a malicious promotion type".

Secondly, in an embodiment of this disclosure, a method for supplementary recognition by combining comment information and bullet screen information is provided. Through the aforementioned method, features not for the content are supplemented by additional comment information to recognize the video malicious promotion. The malicious promotion detection is performed on the content, and the content may be pushed to manual detailed verification in a case of exceeding a threshold. In this way, a recognition flow is optimized and positive closed-loop supplementation for a hierarchical policy combinational algorithm of multi-source information dimensions can be realized.

In an exemplary implementation, based on the foregoing embodiment corresponding to FIG. 3, in another exemplary embodiment provided in the embodiments of this disclosure, the method may further include:

obtain provider information for the video in current period, the provider information including basic information and behavior information of a content provider in the current period; determine an identity confidence of the content provider according to the provider information;

determining a video recognition result corresponding to the video according to the target text classification result may specifically include:

determine a video recognition result corresponding to the video according to the target text classification result and the identity confidence of the content provider.

In this embodiment, a method for dynamically recognizing a label with a tendency of malicious promotion of a content provider is introduced. Each video for malicious promotion corresponds to one content provider, so that modeling labels associated with malicious promotion of the content provider is also of importance to distinguish the malicious promotion of the video. The content providers who post a large number of videos for malicious promotion are often Internet water armies. For example, when a certain content provider posts dozens of videos for malicious promotion within a period of time at short intervals to promote the same or similar products, it can be considered that this content provider is an Internet water army for malicious promotion of a certain company or product. When a certain content provider has been posting videos for malicious promotion within a long period of time to promote various products or content, it can be considered that the content provider is an intermediary water army for malicious promotion, who earns money by malicious promotion.

Figure 11:
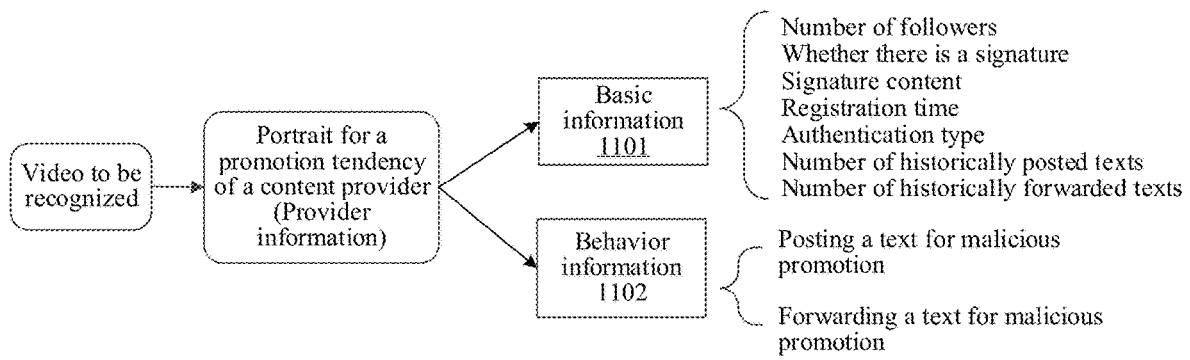
FIG. 11 is a schematic diagram of a recognition framework based on non-content level feature supplementation according to an embodiment of this disclosure.

Specifically, in order to facilitate the comprehension, reference is made to FIG. 11. FIG. 11 is a schematic diagram of a recognition framework based on non-content level feature supplementation according to an embodiment of this disclosure. As shown in the figure, an identity confidence of the content provider is determined by jointly using basic information 1101 of the content provider, such as the number of followers, whether there is a signature, signature content, registration time, authentication type, the number of historically posted videos and the number of historically forwarded videos, and combining behavior information 1102 of the historical videos for malicious promotion, which are posted or forwarded by users. As a result, a basic label with a tendency of malicious promotion of the content provider is established. The identity confidence of the content provider facilitates the judgment of whether determining videos posted or forwarded by the content provider as the videos for malicious promotion, so as to increase the confidence of a judgment result of the hierarchical policy combinational algorithm of multi-source information dimensions. The hazard level of posting videos for malicious promotion is higher than that of forwarding such videos.

The label with a tendency of the content provider dynamically varies depending on self behaviors of the content provider. Therefore, the provider information of the video in this disclosure is only for the current period. Usually, when the content provider posts more videos within shorter time and such videos are determined as those for malicious promotion, the tendency for malicious promotion of this content provider increases more rapidly. In addition, when videos for malicious promotion have been posted or forwarded in the past, but the content provider has not posted videos for malicious promotion recently, the tendency for malicious promotion of this content provider continuously decreases over time.

Secondly, in an embodiment of this disclosure, a method for dynamically recognizing a label with a tendency of malicious promotion of a content provider is provided. Through the aforementioned method, the identify confidence of the content provider is determined according to the provider information obtained within each period. In one aspect, a more accurate label with a tendency of malicious promotion of the content provider may be obtained, facilitating the judgment of the malicious extent of videos. In another aspect, a label with a tendency of malicious promotion of the content provider is established by combining behavior information of the historical videos for malicious promotion, which are posted or forwarded by users. This facilitates the judgment of whether determining videos posted or forwarded by the content provider as the videos for malicious promotion, so as to increase the confidence of a judgment result of the hierarchical policy combinational algorithm of multi-source information dimensions.

In an exemplary implementation, on the basis of the embodiment corresponding to FIG. 3 above, in another exemplary embodiment provided by the embodiments of this disclosure, determining a video recognition result corresponding to the video according to the target text classification result and the identity confidence of the content provider may specifically include:

determine a video recognition result corresponding to the video according to the target text classification result, the original text classification result and the identity confidence of the content provider, the original text classification result being obtained by the text classification model based on original text information and representing a malicious promotion extent of the original text information, and the original text information including at least one of comment information and bullet screen information; or determine a video recognition result corresponding to the video according to the target text classification result, an image classification result and the identity confidence of the content provider, the image classification result being obtained by an image classification model based on the image data and representing a malicious promotion extent of the image data; or determine a video recognition result corresponding to the video according to the target text classification result, the original text classification text, the image classification result, and the identity confidence of the content provider.

In this embodiment, a method for recognizing videos based on non-content level feature supplementation is introduced. In assisted judgment, a plurality of classification results are used for jointly determining, thus increasing the confidence of the judgment result of the hierarchical policy combinational algorithm of multi-source information dimensions.

As an example, a video recognition result corresponding to the video may be determined according to the target text classification result, the original text classification text, and the identity confidence of the content provider. For example, when the target text classification result is "a malicious promotion type", the original text classification result is "a malicious promotion type" and the identity confidence of the content provider is "a malicious promotion type", the video recognition result corresponding to the video is "a malicious promotion type". Also for example, when the target text classification result is "a malicious promotion type", the original text classification result is "not a malicious promotion type" and the identity confidence of the content provider is "not a malicious promotion type", the video recognition result corresponding to the video is "suspected of a malicious promotion type".

As an example, a video recognition result corresponding to the video may be determined according to the target text classification result, the image classification text, and the identity confidence of the content provider. For example, when the target text classification result is "a malicious promotion type", the image classification result is "a malicious promotion type" and the identity confidence of the content provider is "a malicious promotion type", the video recognition result corresponding to the video is "a malicious promotion type". Also for example, when the target text classification result is "a malicious promotion type", the image classification result is "not a malicious promotion type" and the identity confidence of the content provider is "not a malicious promotion type", the video recognition result corresponding to the video is "suspected of a malicious promotion type".

As an example, a video recognition result corresponding to the video may be determined according to the target text classification result, the original text classification text, the image classification result, and the identity confidence of the content provider. For example, when the target text classification result is "a malicious promotion type", the original text classification result is "a malicious promotion type", the image classification result is "a malicious promotion type", and the identity confidence of the content provider is "a malicious promotion type", the video recognition result corresponding to the video is "a malicious promotion type".

The example described above is only an illustration. In actual application, more detailed classification may be used, for example, "a level-1 malicious promotion type" represents that the type is most likely to be a malicious promotion type, "a level-2 malicious promotion type" represents that the type is likely to be a malicious promotion type, ranking only second to "a level-1 malicious promotion type", and so on.

Thirdly, in an embodiment of this disclosure, a method for recognizing videos based on non-content level feature supplementation is provided. Through the aforementioned method, features not for the content are supplemented by additional object behaviors to recognize the malicious promotion of videos. The malicious promotion detection is performed on the content, and the content may be pushed to manual detailed verification in a case of exceeding a threshold. In this way, a recognition flow is optimized and positive closed-loop supplementation for a hierarchical policy combinational algorithm of multi-source information dimensions can be realized.

In an exemplary implementation, on the basis of the embodiment corresponding to FIG. 3 above, in another exemplary embodiment provided by the embodiments of this disclosure, determining a video recognition result corresponding to the video according to the target text classification result may specifically include:

when the target text classification result is greater than or equal to a target text classification threshold, determine that a video recognition result corresponding to the video is of a malicious promotion type;

when the target text classification result is less than the target text classification threshold, determine that the video recognition result corresponding to the video is of a malicious promotion type;

when the target text classification result is greater than or equal to the target text classification threshold and an original text classification result is greater than or equal to an original text classification threshold, determine that the video recognition result corresponding to the video is of a malicious promotion type;

when the target text classification result is greater than or equal to the target text classification threshold, the original text classification result is greater than or equal to the original text classification threshold and an image classification result is greater than or equal to an image classification threshold, determine that the video recognition result corresponding to the video is of a malicious promotion type; and when the target text classification result is greater than or equal to the target text classification threshold, the original text classification result is greater than or equal to the original text classification threshold, the image classification result is greater than or equal to the image classification threshold and an identify confidence of a content provider is greater than or equal to an identify confidence threshold, determine that the video recognition result corresponding to the video is of a malicious promotion type;

after determining the video recognition result corresponding to the video according to the target text classification result, the method further including:

obtain a video annotation result corresponding to the video; and when the video recognition result is inconsistent with the video annotation result, adjust at least one of the target text classification threshold, the original text classification threshold, the image classification threshold and the identify confidence threshold.

In this embodiment, a method for optimizing a multimedia recognition effect by combining swarm intelligence is introduced. This disclosure further provides a design scheme combining machine intelligence and swarm intelligence, mainly including two stages, that is, the early stage of video malicious promotion of videos and the late stage of video malicious promotion.

Figure 12:
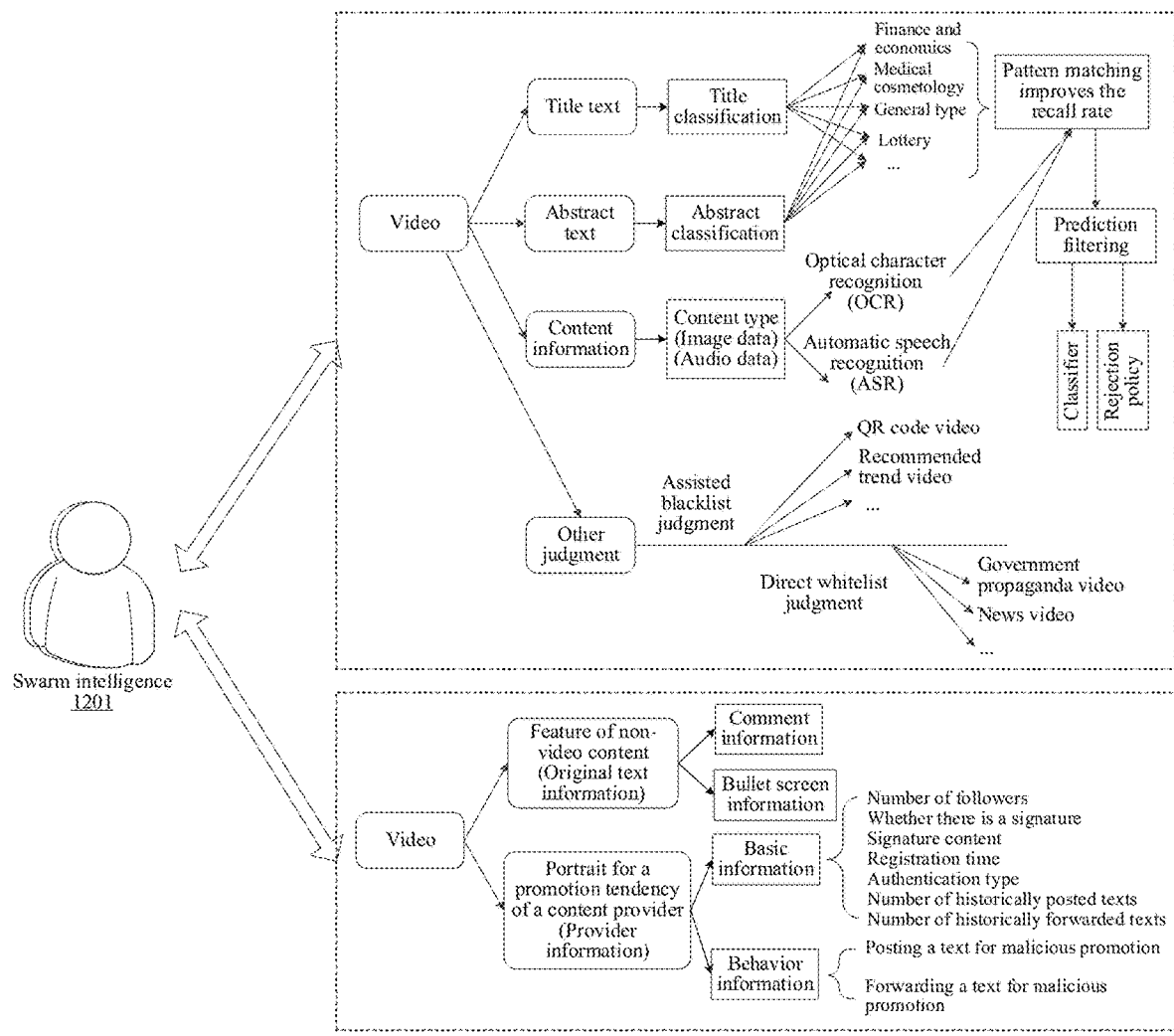
FIG. 12 is a schematic diagram of a whole recognition framework for videos according to an embodiment of this disclosure.

Specifically, in order to facilitate the comprehension, reference is made to FIG. 12. FIG. 12 is a schematic diagram of a whole recognition framework for videos according to an embodiment of this disclosure. As shown in the figure, the early stage for recognizing video malicious promotion means when a video is determined as suspected malicious promotion by an algorithm architecture of multi-source information dimensions and non-content level feature supplementation after being just posted or soon after being posted, the video will be identified by manual operation before an identification conclusion is outputted by final annotation. This is because a current computer device cannot ensure 100% accuracy. For the ecological construction of recognizing and fighting against the video malicious recognition, the current whole technical architecture needs to focus on recall, and gradually improves the accuracy rate on the premise of giving priority to ensuring recall.

At the late stage of video malicious promotion, videos that are determined as malicious promotion through swarm intelligence 1201 need to be included in the "blacklist judgment" policy algorithm or the "whitelist judgment" policy algorithm as per different conditions, thereby continuously supplementing information in the library to form a virtuous circle. For failure cases that are manually determined as the video malicious promotion but are comprehensively determined as video non-malicious promotion by all links of machine intelligence, backtracking may also be performed to inquire reasons, part of thresholds are corrected and adjusted, and data for supervised training is supplemented. At the same time, the tendency of malicious promotion is fed back to a video provider or a video forwarder, the tendency score of malicious promotion is updated, and a content provider whose tendency score of malicious promotion is higher than a certain threshold is added to a library of suspected content providers to more strictly determine videos that are posted or forwarded by the content providers in such library.

As an example, a video is recognized only based on the target text classification result. When the target text classification result is greater than or equal to a target text classification threshold, it is determined that a video recognition result corresponding to the video is of a malicious promotion type. On the contrary, when the target text classification result is less than the target text classification threshold, it is determined that a video recognition result corresponding to the video is of a non-malicious promotion type.

Assuming that a video, which is determined as a malicious promotion type by a machine, but is determined as a non-malicious promotion type after manual auditing. At this time, the target text classification threshold may be adjusted, for example, the target text classification threshold is increased or decreased.

As an example, a video is recognized jointly based on the target text classification result and the original text classification result. When the target text classification result is greater than or equal to the target text classification threshold and the original text classification result is greater than or equal to an original text classification threshold, it is determined that a video recognition result corresponding to the video is of a malicious promotion type.

Assuming that a video, which is determined as a malicious promotion type by a machine, but is determined as a non-malicious promotion type after manual auditing. At this time, at least one of the target text classification threshold and the original text classification threshold may be adjusted.

As an example, a video is recognized jointly based on the target text classification result, the original text classification result and the image classification result. When the target text classification result is greater than or equal to the target text classification threshold, the original text classification result is greater than or equal to the original text classification threshold and an image classification result is greater than or equal to an image classification threshold, it is determined that a video recognition result corresponding to the video is of a malicious promotion type.

Assuming that a video, which is determined as a malicious promotion type by a machine, but is determined as a non-malicious promotion type after manual auditing. At this time, at least one of the target text classification threshold, the original text classification threshold, and the image classification threshold may be adjusted.

As an example, a video is recognized jointly based on the target text classification result, the original text classification result, the image classification result, and the identity confidence of the content provider. When the target text classification result is greater than or equal to the target text classification threshold, the original text classification result is greater than or equal to the original text classification threshold, the image classification result is greater than or equal to the image classification threshold and an identify confidence of a content provider is greater than or equal to an identify confidence threshold, it is determined that a video recognition result corresponding to the video is of a malicious promotion type.

Assuming that a video, which is determined as a malicious promotion type by a machine, but is determined as a non-malicious promotion type after manual auditing. At this time, at least one of the target text classification threshold, the original text classification threshold, the image classification threshold, and the identify confidence threshold may be adjusted.

Secondly, in an embodiment of this disclosure, a method for optimizing a multimedia recognition effect by combining swarm intelligence is provided. Through the aforementioned method, on the basis of a hierarchical policy combinational algorithm of multi-source information dimensions and non-content level feature supplementation, videos for malicious promotion may be recognized, but there may be some inaccurate recognitions. Therefore, this disclosure further provides a design scheme combining machine intelligence and swarm intelligence, which may gradually improve the accuracy rate on the premise of giving priority to ensuring recall.

Figure 13:
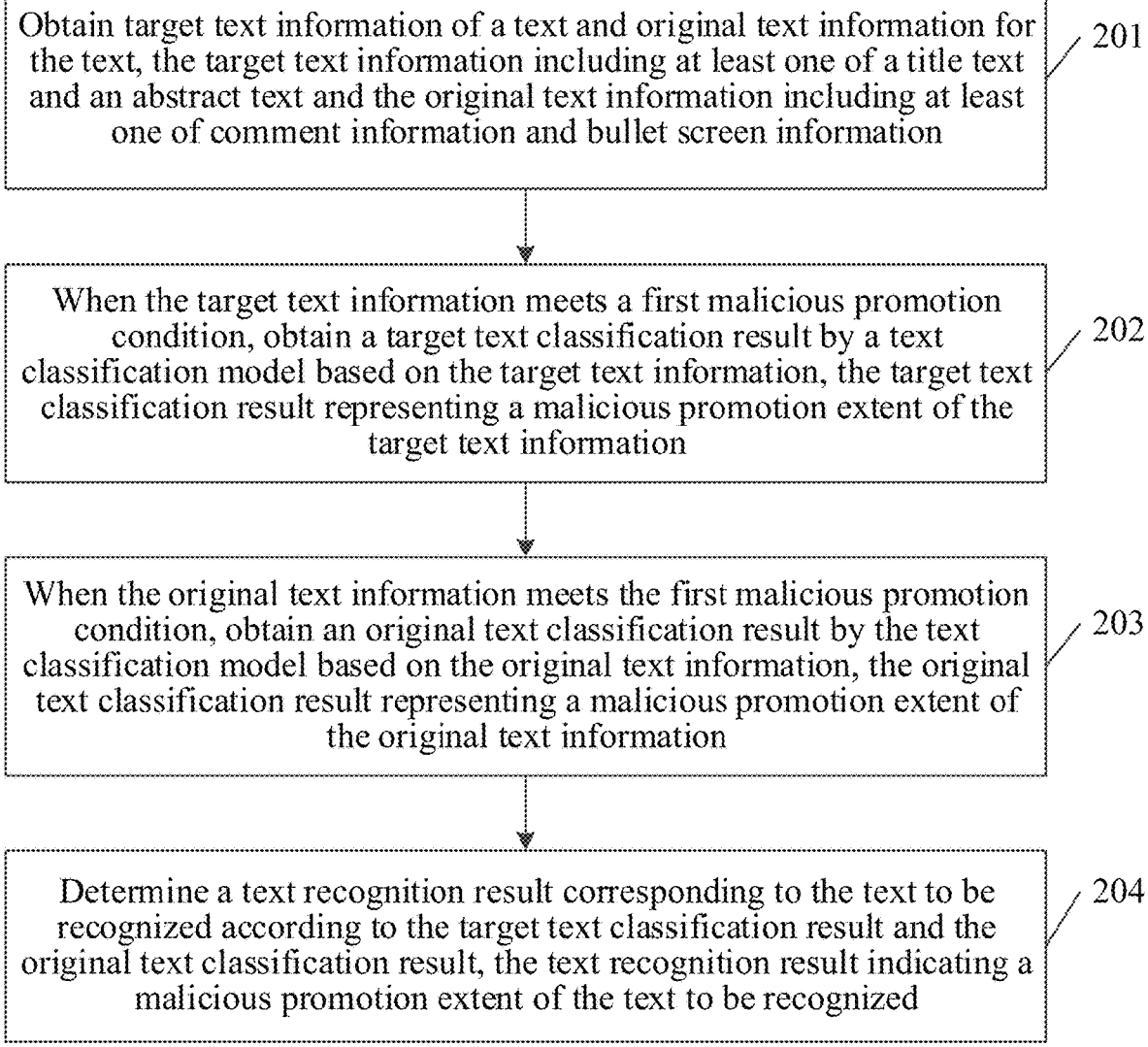
FIG. 13 is another schematic flowchart of a recognition method for multimedia content according to an embodiment of this disclosure.

The recognition method for multimedia content in this disclosure is introduced below with reference to the foregoing introduction. Referring to FIG. 13, another embodiment of the recognition method for multimedia content in the embodiments of this disclosure includes the following steps:

201: Obtain target text information of a text to be recognized and original text information for the text to be recognized, the target text information including at least one of a title text and an abstract text and the original text information including at least one of comment information and bullet screen information.

Figures 14, 15:
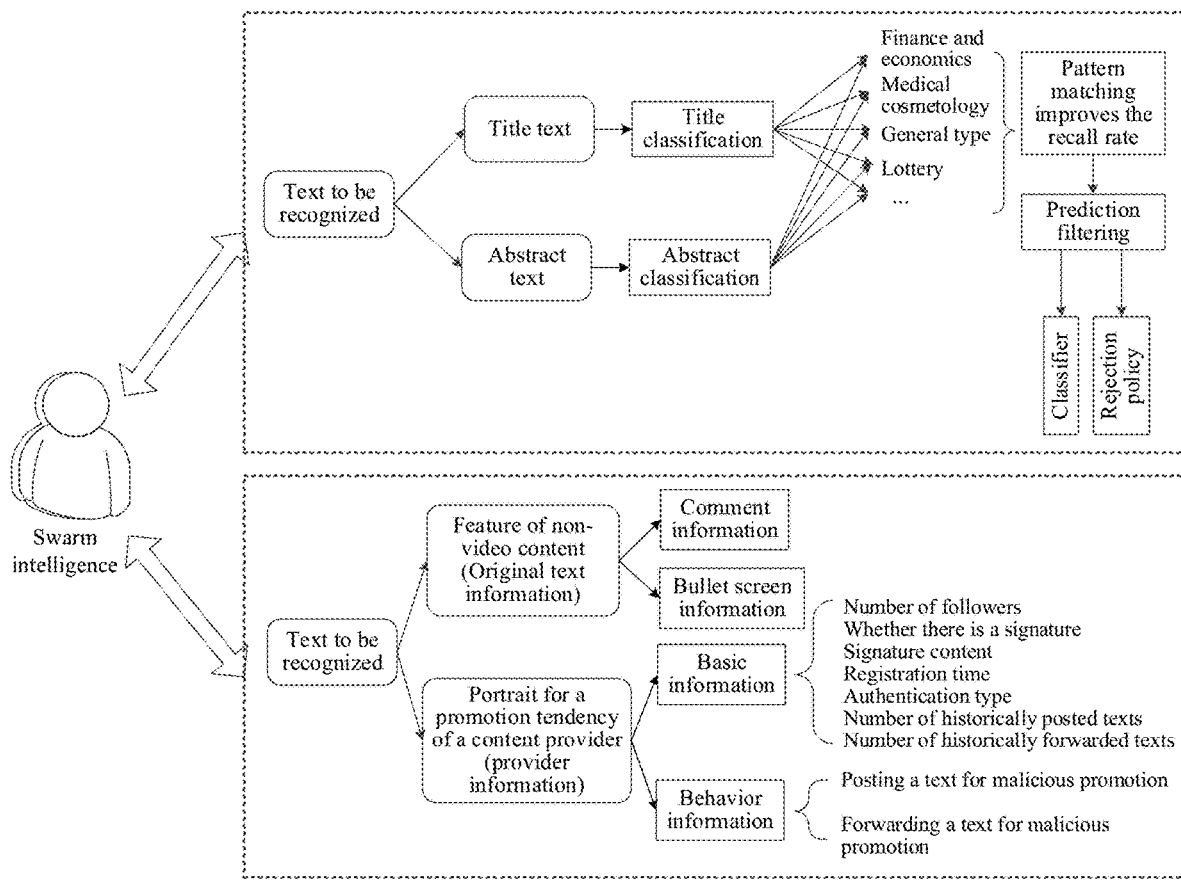
FIG. 14 is a schematic diagram of a whole recognition framework for texts according to an embodiment of this disclosure.
FIG. 15 is a schematic diagram of a recognition scenario of text type multimedia content according to an embodiment of this disclosure.

In this embodiment, a recognition apparatus for multimedia content obtains target text information and content information in a text to be recognized. In order to facilitate the comprehension, reference is made to FIG. 14. FIG. 14 is a schematic diagram of a whole recognition framework for texts according to an embodiment of this disclosure. As shown in the figure, the target text information may include at least one of a title text and an abstract text and the original text information may include at least one of comment information and bullet screen information.

The recognition apparatus for multimedia content may be deployed on a server, a terminal device, or a recognition system for multimedia content composed of a terminal device and a server, which is not limited herein.

202: When the target text information meets a first malicious promotion condition, obtain a target text classification result by a text classification model based on the target text information, the target text classification result representing a malicious promotion extent of the target text information;

In this embodiment, the recognition apparatus for multimedia content determines whether the target text information meets a first malicious promotion condition. It can be understood that the case of meeting the first malicious promotion condition may be the hit of a keyword or template in a matching library. With regard to the target text information meeting the first malicious promotion condition, the target text classification result may be obtained by inputting the information into a trained text classification model, where the target text classification result may be a binary classification result, for example, "a malicious promotion type" or "not a malicious promotion type". Alternatively, the target text classification result may be a multi-classification result, for example, "a malicious promotion type", "suspected of a malicious promotion type" or "not a malicious promotion type".

203: When the original text information meets the first malicious promotion condition, obtain an original text classification result by the text classification model based on the original text information, the original text classification result representing a malicious promotion extent of the original text information.

In this embodiment, similarly, the recognition apparatus for multimedia content determines whether the original text information meets the first malicious promotion condition. With regard to the original text information meeting the first malicious promotion condition, the original text classification result may be obtained by inputting the information into a trained text classification model, where the original text classification result may be a binary classification result or a multi-classification result.

204: Determine a text recognition result corresponding to the text to be recognized according to the target text classification result and/or the original text classification result, the text recognition result representing a malicious promotion extent of the text to be recognized.

In this embodiment, the recognition apparatus for multimedia content determines a text recognition result corresponding to the text to be recognized according to the target text classification result and the original text classification result. For example, when the target text classification result is "a malicious promotion type" and the original text classification result is also "a malicious promotion type", the text recognition result corresponding to the text to be recognized is outputted as "a malicious promotion type", and the malicious promotion extent is the highest. Also for example, when the target text classification result is "a malicious promotion type" and the original text classification result is "not a malicious promotion type", the text recognition result corresponding to the text to be recognized is outputted as "suspected of a malicious promotion type". Still for example, when the target text classification result is "not a malicious promotion type" and the original text classification result is "not a malicious promotion type", the text recognition result corresponding to the text to be recognized is outputted as "not a malicious promotion type".

Specifically, in order to facilitate the comprehension, reference is made to FIG. 15. FIG. 15 is a schematic diagram of a recognition scenario of text type multimedia content according to an embodiment of this disclosure. As shown in the figure, recognition results of different texts may be shown to the content manager after text recognition. In one aspect, a text recognition platform 1500 may directly remove or delete texts of "a malicious promotion type". In another aspect, a content manager may also further view specific information of the texts to manually check the accuracy of output results.

In the embodiments of this disclosure, a recognition method for multimedia content is provided. In this way, the malicious promotion extent of multimedia content is recognized from different aspects. With regard to the media form of text type multimedia content, a more comprehensive grasp for the quality of texts is conducted in the aspects of titles, abstracts, original text information etc. to form a more complete recognition policy for text malicious promotion, thereby improving the accuracy of recognizing the text malicious promotion.

Figure 16:
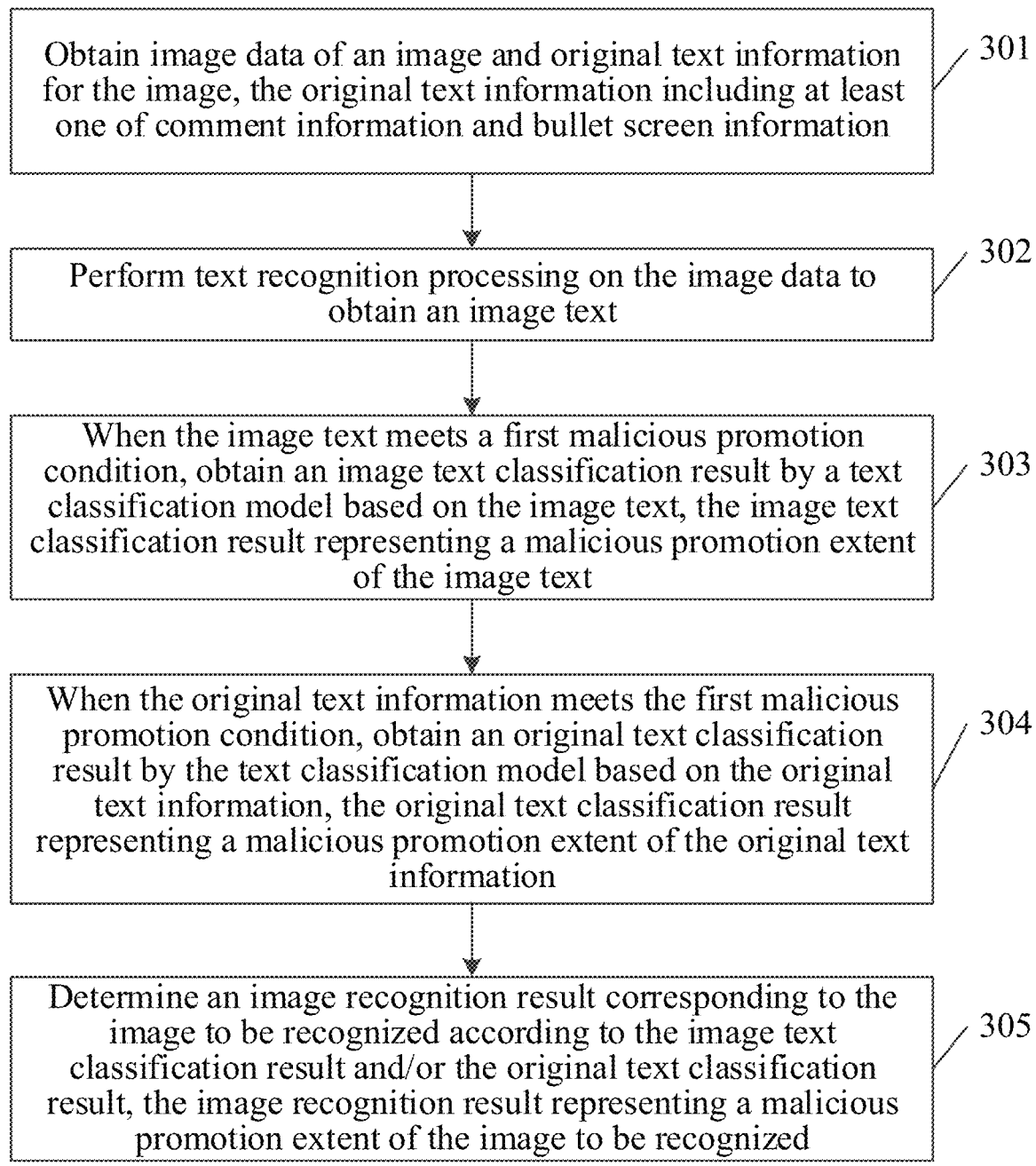
FIG. 16 is another schematic flowchart of a recognition method for multimedia content according to an embodiment of this disclosure.

The recognition method for multimedia content in this disclosure is introduced below with reference to the foregoing introduction. Referring to FIG. 16, another embodiment of the recognition method for multimedia content in the embodiments of this disclosure includes the following steps:

301: Obtain image data of an image to be recognized and original text information for the image to be recognized, the original text information including at least one of comment information and bullet screen information.

Figures 17, 18:
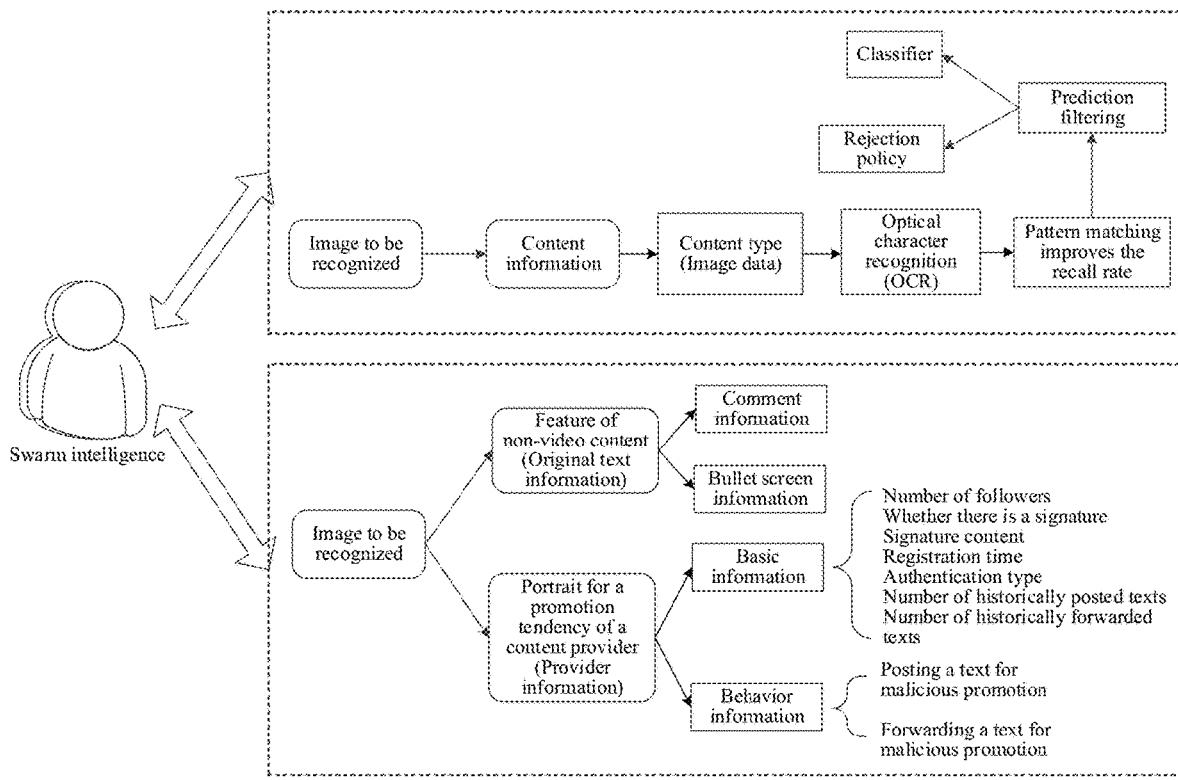
FIG. 17 is a schematic diagram of a whole recognition framework for images according to an embodiment of this disclosure.
FIG. 18 is a schematic diagram of a recognition scenario of image type multimedia content according to an embodiment of this disclosure.

In this embodiment, the recognition apparatus for multimedia content obtains image data and original text information of an image to be recognized. In order to facilitate the comprehension, reference is made to FIG. 17. FIG. 17 is a schematic diagram of a whole recognition framework for images according to an embodiment of this disclosure. As shown in the figure, the original text information may include at least one of comment information and bullet screen information.

The recognition apparatus for multimedia content may be deployed on a server, a terminal device, or a recognition system for multimedia content composed of a terminal device and a server, which is not limited herein.

302: Perform text recognition processing on the image data to obtain an image text.

In this embodiment, the recognition apparatus for multimedia content performs OCR processing on the image data in the image to be recognized to obtain the image text.

303: When the image text meets a first malicious promotion condition, obtain an image text classification result by a text classification model based on the image text, the image text classification result representing a malicious promotion extent of the image text.

In this embodiment, the recognition apparatus for multimedia content determines whether the image text meets the first malicious promotion condition. It can be understood that the case of meeting the first malicious promotion condition may be the hit of a keyword or template in a matching library. With regard to the image text meeting the first malicious promotion condition, the image text classification result may be obtained by inputting the information into a trained text classification model, where the image text classification result may be a binary classification result, for example, "a malicious promotion type" or "not a malicious promotion type". Alternatively, the image text classification result may be a multi-classification result, for example, "a malicious promotion type", "suspected of a malicious promotion type" or "not a malicious promotion type".

304: When the original text information meets the first malicious promotion condition, obtain an original text classification result by the text classification model based on the original text information, the original text classification result representing a malicious promotion extent of the original text information.

In this embodiment, similarly, the recognition apparatus for multimedia content determines whether the original text information meets the first malicious promotion condition. With regard to the original text information meeting the first malicious promotion condition, the original text classification result may be obtained by inputting the information into a trained text classification model, where the original text classification result may be a binary classification result or a multi-classification result.

305: Determine an image recognition result corresponding to the image to be recognized according to the image text classification result and/or the original text classification result, the image recognition result representing a malicious promotion extent of the image to be recognized.

In this embodiment, the recognition apparatus for multimedia content determines an image recognition result corresponding to the image to be recognized according to the image text classification result and the original text classification result. For example, when the image text classification result is "a malicious promotion type" and the original text classification result is also "a malicious promotion type", the image recognition result corresponding to the image to be recognized is outputted as "a malicious promotion type", and the malicious promotion extent is the highest. Also for example, when the image text classification result is "a malicious promotion type" and the original text classification result is "not a malicious promotion type", the image recognition result corresponding to the image to be recognized is outputted as "suspected of a malicious promotion type". Still for example, when the image text classification result is "not a malicious promotion type" and the original text classification result is "not a malicious promotion type", the image recognition result corresponding to the image to be recognized is outputted as "not a malicious promotion type".

Specifically, in order to facilitate the comprehension, reference is made to FIG. 18. FIG. 18 is a schematic diagram of a recognition scenario of image type multimedia content according to an embodiment of this disclosure. As shown in the figure, recognition results of different images may be shown to the content manager after text recognition. In one aspect, an image recognition platform 1800 may directly remove or delete images of "a malicious promotion type". In another aspect, the content manager may also further view specific information of the images to manually check the accuracy of output results.

In the embodiments of this disclosure, a recognition method for multimedia content is provided. In this way, the malicious promotion extent of multimedia content is recognized from different aspects. With regard to the media form of text type multimedia content, a more comprehensive grasp for the quality of images is conducted in the aspects of image data, original text information etc. to form a more complete recognition policy for image malicious promotion, thereby improving the accuracy of recognizing the image malicious promotion.

Figure 19:
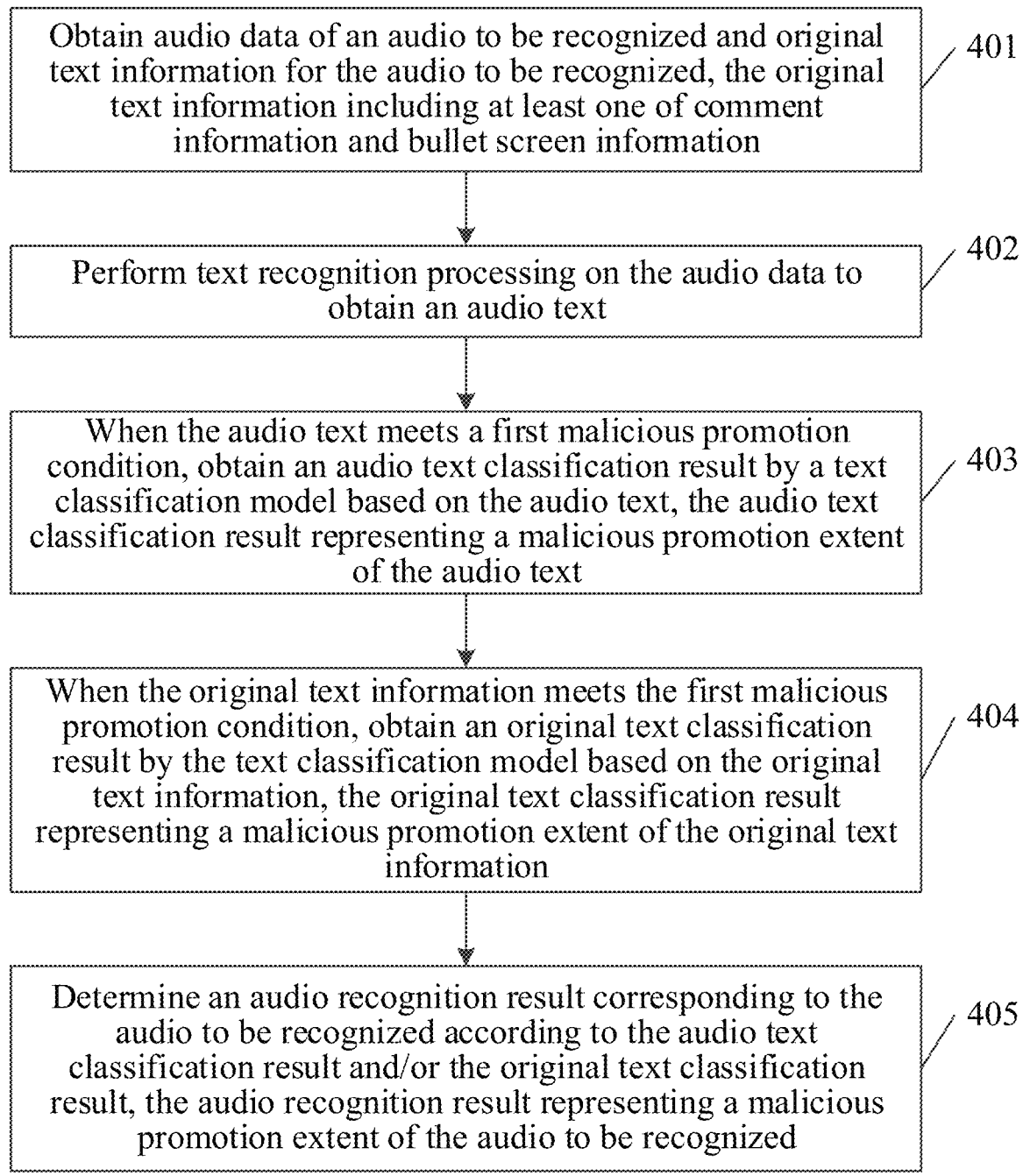
FIG. 19 is another schematic flowchart of a recognition method for multimedia content according to an embodiment of this disclosure.

The recognition method for multimedia content in this disclosure is introduced below with reference to the foregoing introduction. Referring to FIG. 19, another embodiment of the recognition method for multimedia content in the embodiments of this disclosure includes the following steps:

401: Obtain audio data of an audio to be recognized and original text information for the audio to be recognized, the original text information including at least one of comment information and bullet screen information.

Figures 20, 21:
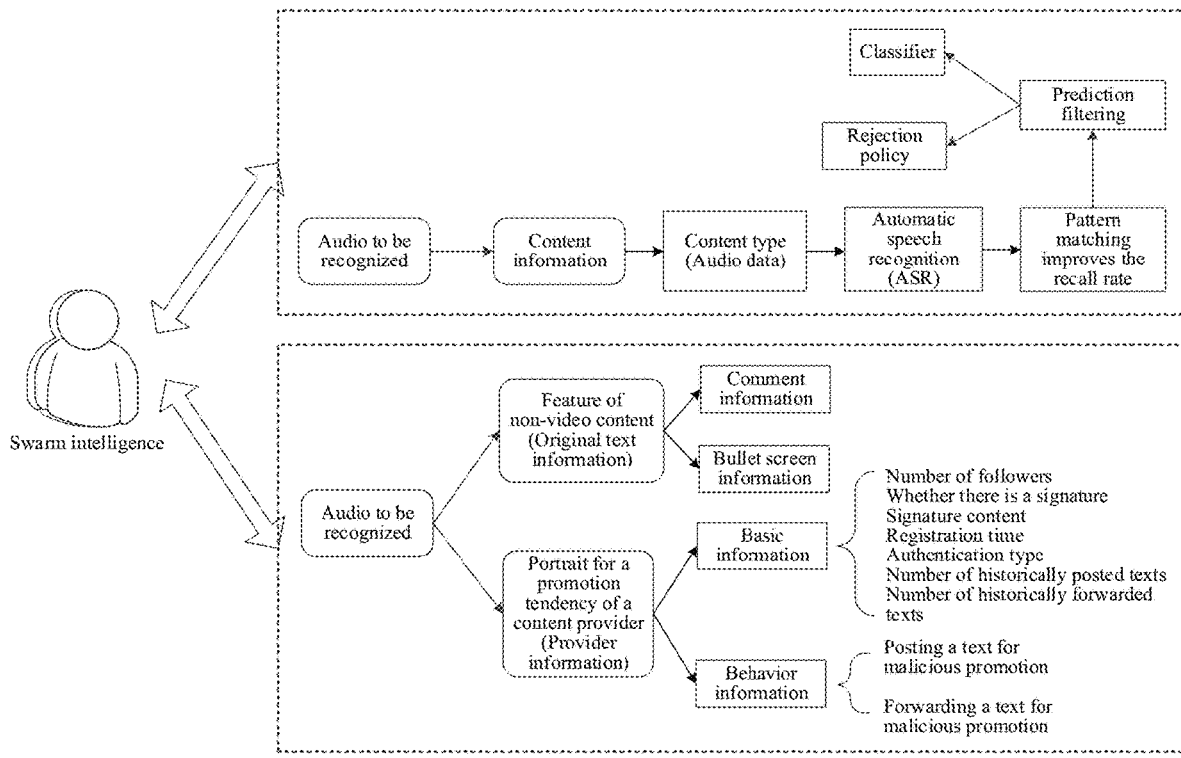
FIG. 20 is a schematic diagram of a whole recognition framework for audios according to an embodiment of this disclosure.
FIG. 21 is a schematic diagram of a recognition scenario of audio type multimedia content according to an embodiment of this disclosure.

In this embodiment, the recognition apparatus for multimedia content obtains audio data and original text information of an audio to be recognized. In order to facilitate the comprehension, reference is made to FIG. 20. FIG. 20 is a schematic diagram of a whole recognition framework for audios according to an embodiment of this disclosure. As shown in the figure, the original audio information may include at least one of comment information and bullet screen information.

The recognition apparatus for multimedia content may be deployed on a server, a terminal device, or a recognition system for multimedia content composed of a terminal device and a server, which is not limited herein.

402: Perform text recognition processing on the audio data to obtain an audio text.

In this embodiment, the recognition apparatus for multimedia content performs ASR processing on the audio data in the audio to be recognized to obtain the audio text.

403: When the audio text meets a first malicious promotion condition, obtain an audio text classification result by a text classification model based on the audio text, the audio text classification result representing a malicious promotion extent of the audio text.

In this embodiment, the recognition apparatus for multimedia content determines whether the audio text meets the first malicious promotion condition. It can be understood that the case of meeting the first malicious promotion condition may be the hit of a keyword or template in a matching library. With regard to the audio text meeting the first malicious promotion condition, the audio text classification result may be obtained by inputting the information into a trained text classification model, where the audio text classification result may be a binary classification result, for example, "a malicious promotion type" or "not a malicious promotion type". Alternatively, the audio text classification result may be a multi-classification result, for example, "a malicious promotion type", "suspected of a malicious promotion type" or "not a malicious promotion type".

404: When the original text information meets the first malicious promotion condition, obtain an original text classification result by the text classification model based on the original text information, the original text classification result representing a malicious promotion extent of the original text information.

In this embodiment, similarly, the recognition apparatus for multimedia content determines whether the original text information meets the first malicious promotion condition. With regard to the original text information meeting the first malicious promotion condition, the original text classification result may be obtained by inputting the information into a trained text classification model, where the original text classification result may be a binary classification result or a multi-classification result.

405: Determine an audio recognition result corresponding to the audio to be recognized according to the audio text classification result and/or the original text classification result, the audio recognition result representing a malicious promotion extent of the audio to be recognized.

In this embodiment, the recognition apparatus for multimedia content determines an audio recognition result corresponding to the audio to be recognized according to the audio text classification result and the original text classification result. For example, when the audio text classification result is "a malicious promotion type" and the original text classification result is also "a malicious promotion type", the audio recognition result corresponding to the audio to be recognized is outputted as "a malicious promotion type", and the malicious promotion extent is the highest. Also for example, when the audio text classification result is "a malicious promotion type" and the original text classification result is "not a malicious promotion type", the audio recognition result corresponding to the audio to be recognized is outputted as "suspected of a malicious promotion type". Still for example, when the audio text classification result is "not a malicious promotion type" and the original text classification result is also "not a malicious promotion type", the audio recognition result corresponding to the audio to be recognized is outputted as "not a malicious promotion type".

Specifically, in order to facilitate the comprehension, reference is made to FIG. 21. FIG. 21 is a schematic diagram of a recognition scenario of audio type multimedia content according to an embodiment of this disclosure. As shown in the figure, recognition results of different audios may be shown to the content manager after text recognition. In one aspect, an audio recognition platform 2100 may directly remove or delete audios of "a malicious promotion type". In another aspect, the content manager may also further view specific information of the audios to manually check the accuracy of output results.

In the embodiments of this disclosure, a recognition method for multimedia content is provided. In this way, the malicious promotion extent of multimedia content is recognized from different aspects. With regard to the media form of text type multimedia content, a more comprehensive grasp for the quality of audios is conducted in the aspects of audio data, original text information etc. to form a more complete recognition policy for audio malicious promotion, thereby improving the accuracy of recognizing the audio malicious promotion.

Figure 22:
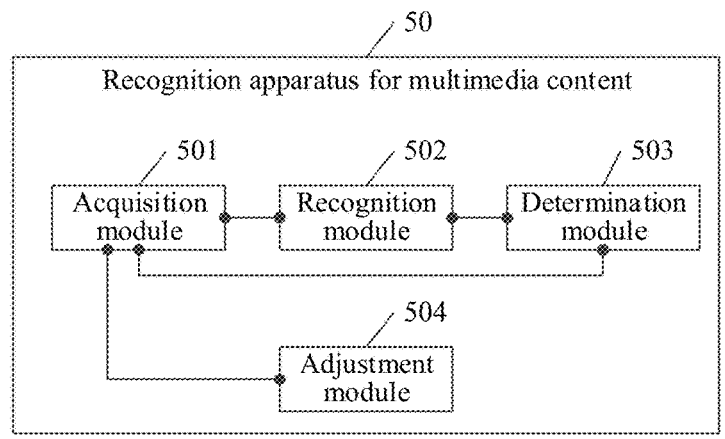
FIG. 22 is a schematic flowchart of a recognition apparatus for multimedia content according to an embodiment of this disclosure.

A recognition apparatus for multimedia content in this disclosure is described below in detail. FIG. 22 is a schematic diagram of an embodiment of a recognition apparatus for multimedia content according to an embodiment of this disclosure. The recognition apparatus for multimedia content 50 includes:

an acquisition module 501 configured to obtain target text information and content information in a video, the target text information including at least one of a title text and an abstract text, and the content information including at least one of image data and audio data;

a recognition module 502 configured to perform text recognition processing on the content information to obtain associated text information, the associated text information including at least one of an image text and an audio text, the image text being obtained after text recognition of the image data, and the audio text being obtained after text recognition of the audio data;

the acquisition module 501 further configured to take at least one of the target text information meeting a first malicious promotion condition and the associated text information as text content, and obtain a target text classification result by a text classification model based on the text content, the target text classification result representing a malicious promotion extent of the text content; and the recognition module 502 further configured to determine a video recognition result corresponding to the video according to the target text classification result, the video recognition result representing a malicious promotion extent of the video.

In an embodiment of this disclosure, a recognition apparatus for multimedia content is provided. Through the aforementioned apparatus, the malicious promotion extent of multimedia content is recognized from different aspects. With regard to the media form of video type multimedia content, a more comprehensive grasp for the quality of videos is conducted in the aspects of titles, abstracts, images, audios, etc. to form a more complete recognition policy for video malicious promotion, thereby improving the accuracy of recognizing the video malicious promotion.

In an exemplary implementation, based on the embodiment corresponding to FIG. 22, in another exemplary embodiment of the recognition apparatus for multimedia content 50 provided in the embodiments of this disclosure, content information includes image data;

the recognition module 502, specifically configured to perform framing processing on the image data included in the video to obtain K video frames, where K is an integer greater than or equal to 1;

obtaining L video frames from the K video frames according to a preset frame rate, where L is an integer greater than or equal to 1 and less than the K;

performing OCR processing on each video frame in the L video frames to obtain a text recognition result of each video frame, the text recognition result including captions and coordinate information corresponding to the captions;

performing deduplication on the captions in each video frame of the L video frames according to the coordinate information corresponding to the captions; and taking the captions after deduplication in each video frame as the image text in the associated text information.

In an embodiment of this disclosure, a recognition apparatus for multimedia content is provided. Through the aforementioned apparatus, firstly, frame extraction is performed on the image data of a video, and a recognized image text is matched with a template. In this way, the dimension of recognizing videos for malicious promotion is increased, thereby facilitating the improvement of the accuracy of recognizing the video malicious promotion.

In an exemplary implementation, based on the embodiment corresponding to FIG. 22, in another exemplary embodiment of recognition apparatus for multimedia content 50 provided in the embodiments of this disclosure, content information includes audio data;

the recognition module 502 specifically configured to perform framing processing on the audio data included in the video to obtain T audio frames, where the T is an integer greater than or equal to 1;

performing feature extraction processing on each audio frame of the T audio frames to obtain an audio feature vector corresponding to each audio frame; and determining an audio text in the associated text information based on the audio feature vector corresponding to each audio frame.

In an embodiment of this disclosure, a recognition apparatus for multimedia content is provided. Through the aforementioned apparatus, firstly, the audio data of a video is recognized, and a recognized audio text is matched with a template. In this way, the dimension of recognizing videos for malicious promotion is increased, thereby facilitating the improvement of the accuracy of recognizing the video malicious promotion.

In an exemplary implementation, based on the embodiment corresponding to FIG. 22, in another embodiment of the recognition apparatus for multimedia content 50 provided in the embodiments of this disclosure, the recognition apparatus for multimedia content 50 further includes a determination module 503;

the determination module 503 configured to determine that the title text meets the first malicious promotion condition and the target text information meets the first malicious promotion condition, when the title text successfully matches with a template in a matching library and fails to match with information in a whitelist;

the determination module 503 further configured to determine that the abstract text meets the first malicious promotion condition and the target text information meets the first malicious promotion condition, when the abstract text successfully matches with a template in the matching library and fails to match with information in the whitelist;

the determination module 503 further configured to determine that the image text meets the first malicious promotion condition and the associated text information meets the first malicious promotion condition, when the image text successfully matches with a template in the matching library and fails to match with information in the whitelist; and the determination module 503 further configured to determine that the audio text meets the first malicious promotion condition and the associated text information meets the first malicious promotion condition, when the audio text successfully matches with a template in the matching library and fails to match with information in the whitelist.

In an embodiment of this disclosure, a recognition apparatus for multimedia content is provided. Through the aforementioned apparatus, videos that may have malicious promotion can be found based on the template matching, and videos that are included in the whitelist can be filtered based on the rejection policy. Therefore, the accuracy of recalling videos can be improved.

In an exemplary implementation, based on the embodiment corresponding to FIG. 22, in another exemplary embodiment of the recognition apparatus for multimedia content provided in the embodiments of this disclosure, the acquisition module 501 is specifically configured to, when the title text meets the first malicious promotion condition, obtain a title text classification result by the text classification model based on the title text;

when the abstract text meets the first malicious promotion condition, obtain an abstract text classification result by the text classification model based on the abstract text;

when the image text meets the first malicious promotion condition, obtain an image text classification result by the text classification model based on the image text; and when the audio text meets the first malicious promotion condition, obtain an audio text classification result by the text classification model based on the audio text.

In an embodiment of this disclosure, a recognition apparatus for multimedia content is provided. Through the aforementioned apparatus, since the text classification model is a single classifier, a target text classification result (including a title text classification result, an abstract text classification result, an image text classification result and an audio text classification result) may be directly predicted. In addition, multiple predication branches may be processed in parallel, that is, multiple multimedia content may be classified simultaneously, thereby improving the classification prediction efficiency.

In an exemplary implementation, based on the embodiment corresponding to FIG. 22, in another exemplary embodiment of the recognition apparatus for multimedia content 50 provided in the embodiments of this disclosure, the acquisition module 501 is specifically configured to, when the title text meets the first malicious promotion condition, based on the title text, obtain N title text classification sub-results by N sub-classification models included in the text classification model, respectively, and determine a title text classification result according to the N title text classification sub-results, each title text classification sub-result corresponding to one malicious promotion type;

when the abstract text meets the first malicious promotion condition, based on the abstract text, obtain N abstract text classification sub-results by N sub-classification models included in the text classification model, respectively, and determine an abstract text classification result according to the N abstract text classification sub-results, each abstract text classification sub-result corresponding to one malicious promotion type;

when the image text meets the first malicious promotion condition, based on the image text, obtain N image text classification sub-results by N sub-classification models included in the text classification model, respectively, and determine an image text classification result according to the N image text classification sub-results, each image text classification sub-result corresponding to one malicious promotion type; and when the audio text meets the first malicious promotion condition, based on the audio text, obtain N audio text classification sub-results by N sub-classification models included in the text classification model, respectively, and determine an audio text classification result according to the N audio text classification sub-results, each audio text classification sub-result corresponding to one malicious promotion type.

In an embodiment of this disclosure, a recognition apparatus for multimedia content is provided. Through the aforementioned apparatus, since the text classification model includes a plurality of classifiers, a plurality of text classification sub-results (including a title text classification sub-result, an abstract text classification sub-result, an image text classification sub-result and an audio text classification sub-result) may be predicted. Finally, a target text classification result is determined based on the plurality of text classification sub-results. Therefore, more detailed classification may be performed on multimedia content and subsequent recognition may be performed for specific types, thereby improving the recognition accuracy.

In an exemplary implementation, based on the embodiment corresponding to FIG. 22, in another exemplary embodiment of the recognition apparatus for multimedia content 50 provided in the embodiments of this disclosure, the acquisition module 501 is further configured to, when the content information includes the image data, obtain an image classification result by an image classification model based on the image data, the image classification result representing a malicious promotion extent of the image data; and the recognition module 502 is specifically configured to determine a video recognition result corresponding to the video according to the target text classification result and the image classification result.

In an embodiment of this disclosure, a recognition apparatus for multimedia content is provided. Through the aforementioned apparatus, firstly, the image data in a video is recognized to obtain an image classification result; and then, whether the video is of the malicious promotion type is determined by combining the image classification result and the target text classification result obtained after text recognition. In this way, hierarchical policies in all source information dimensions are combined together to achieve complementary effects.

In an exemplary implementation, based on the embodiment corresponding to FIG. 22, in another exemplary embodiment of the recognition apparatus for multimedia content provided in the embodiments of this disclosure, the recognition module 502 is specifically configured to, when the image classification result represents that the video includes an information code and the target text classification result meets a second malicious promotion condition, determine that a video recognition result corresponding to the video is a video for malicious promotion;

when the image classification result represents that the video includes a trend chart and the target text classification result meets the second malicious promotion condition, determine that a video recognition result corresponding to the video is a video for malicious promotion; and when the image classification result represents that the video is of a preset video type, determine that a video recognition result corresponding to the video is a video not for malicious promotion.

In an embodiment of this disclosure, a recognition apparatus for multimedia content is provided. Through the aforementioned apparatus, on the video content level, the "whitelist judgment" policy algorithm and the "blacklist judgment" policy algorithm are introduced based on the accumulation of capabilities of recognizing low-quality videos in combination with video content features. When one of the "whitelist judgment" policy algorithms is hit by a video, such video is automatically classified as a video not for malicious promotion. When the "blacklist judgment" policy algorithm is hit, that is, as an assisted feature for determining whether a video is a video for malicious promotion, such video is not directly determined as the one for malicious promotion.

In an exemplary implementation, based on the embodiment corresponding to FIG. 22, in another exemplary embodiment of the recognition apparatus for multimedia content 50 provided in the embodiments of this disclosure, the acquisition module 501 is further configured to obtain original text information for the video, the original text information including at least one of comment information and bullet screen information;

the acquisition module 501 is further configured to, when the original text information meets a first malicious promotion condition, obtain an original text classification result by the text classification model based on the original text information, the original text classification result representing a malicious promotion extent of the original text information;

the recognition module 502 is further configured to determine a video recognition result corresponding to the video according to the target text classification result and the original text classification result; or determine a video recognition result corresponding to the video according to the target text classification result, the original text classification result and an image classification result, the image classification result being obtained by an image classification model based on the image data and representing a malicious promotion extent of the image data.

In an embodiment of this disclosure, a recognition apparatus for multimedia content is provided. Through the aforementioned apparatus, features not for the content are supplemented by additional comment information to recognize the malicious promotion of videos. The malicious promotion detection is performed on the content, and the content may be pushed to manual detailed verification in a case of exceeding a threshold. In this way, a recognition flow is optimized and positive closed-loop supplementation for a hierarchical policy combinational algorithm of multi-source information dimensions can be realized.

In an exemplary implementation, based on the embodiment corresponding to FIG. 22, in another exemplary embodiment of the recognition apparatus for multimedia content 50 provided in the embodiments of this disclosure, the acquisition module 501 is further configured to obtain provider information for the video in current period, the provider information including basic information and behavior information of a content provider in the current period;

the determination module 503 is further configured to determine an identity confidence of the content provider according to the provider information; and the recognition module 502 is further configured to determine a video recognition result corresponding to the video according to the target text classification result and the identity confidence of the content provider.

In an embodiment of this disclosure, a recognition apparatus for multimedia content is provided. Through the aforementioned apparatus, the identify confidence of the content provider is determined according to the provider information obtained within each period. In one aspect, a more accurate label with a tendency of malicious promotion of the content provider may be obtained, facilitating the judgment of the malicious extent of videos. In another aspect, a label with a tendency of malicious promotion of the content provider is established by combining behavior information of the historical videos for malicious promotion, which are posted or forwarded by users. This facilitates the judgment of whether determining videos posted or forwarded by the content provider as the videos for malicious promotion, so as to increase the confidence of a judgment result of the hierarchical policy combinational algorithm of multi-source information dimensions.

In an exemplary implementation, based on the embodiment corresponding to FIG. 22, in another exemplary embodiment of the recognition apparatus for multimedia content 50 provided in the embodiments of this disclosure, the recognition module 502 is specifically configured to determine a video recognition result corresponding to the video according to the target text classification result, the original text classification result and the identity confidence of the content provider, the original text classification result being obtained by the text classification model based on original text information and representing a malicious promotion extent of the original text information, and the original text information including at least one of comment information and bullet screen information; or determine a video recognition result corresponding to the video according to the target text classification result, an image classification result and the identity confidence of the content provider, the image classification result being obtained by an image classification model based on the image data and representing a malicious promotion extent of the image data; or determine a video recognition result corresponding to the video according to the target text classification result, the original text classification text, the image classification result, and the identity confidence of the content provider.

In an embodiment of this disclosure, a recognition apparatus for multimedia content is provided. Through the aforementioned apparatus, features not for the content are supplemented by additional object behaviors to recognize the malicious promotion of videos. The malicious promotion detection is performed on the content, and the content may be pushed to manual detailed verification in a case of exceeding a threshold. In this way, a recognition flow is optimized and positive closed-loop supplementation for a hierarchical policy combinational algorithm of multi-source information dimensions can be realized.

In an exemplary implementation, based on the embodiment corresponding to FIG. 22, in another embodiment of the recognition apparatus for multimedia content 50 provided in the embodiments of this disclosure, the recognition apparatus for multimedia content 50 further includes an adjustment module 504;

the recognition module 502 specifically configured to determine that a video recognition result corresponding to the video is of a malicious promotion type, when the target text classification result is greater than or equal to a target text classification threshold;

when the target text classification result is less than the target text classification threshold, determine that the video recognition result corresponding to the video is of a malicious promotion type;

when the target text classification result is greater than or equal to the target text classification threshold and an original text classification result is greater than or equal to an original text classification threshold, determine that the video recognition result corresponding to the video is of a malicious promotion type;

when the target text classification result is greater than or equal to the target text classification threshold, the original text classification result is greater than or equal to the original text classification threshold and an image classification result is greater than or equal to an image classification threshold, determine that the video recognition result corresponding to the video is of a malicious promotion type; and when the target text classification result is greater than or equal to the target text classification threshold, the original text classification result is greater than or equal to the original text classification threshold, the image classification result is greater than or equal to the image classification threshold and an identify confidence of a content provider is greater than or equal to an identify confidence threshold, determine that the video recognition result corresponding to the video is of a malicious promotion type;

the acquisition module 501 further configured to obtain a video annotation result corresponding to a video after determining a video recognition result corresponding to the video according to the target text classification result; and the adjustment module 504 configured to adjust at least one of the target text classification threshold, the original text classification threshold, the image classification threshold and the identify confidence threshold when the video recognition result is inconsistent with the video annotation result.

In an embodiment of this disclosure, a recognition apparatus for multimedia content is provided. Through the aforementioned apparatus, on the basis of a hierarchical policy combinational algorithm of multi-source information dimensions and non-content level feature supplementation, videos for malicious promotion may be recognized, but there may be some inaccurate recognitions. Therefore, this disclosure further provides a design scheme combining machine intelligence and swarm intelligence, which may gradually improve the accuracy rate on the premise of giving priority to ensuring recall.

Figure 23:
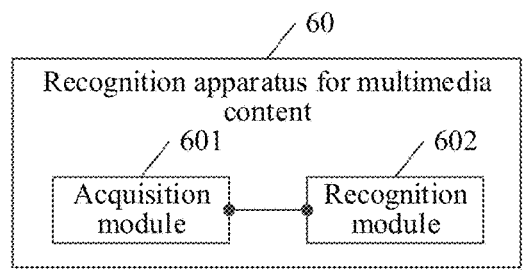
FIG. 23 is another schematic flowchart of a recognition apparatus for multimedia content according to an embodiment of this disclosure.

A recognition apparatus for multimedia content in this disclosure is described below in detail. FIG. 23 is a schematic diagram of an embodiment of a recognition apparatus for multimedia content according to an embodiment of this disclosure. The recognition apparatus for multimedia content 60 includes:

an acquisition module 601 configured to obtain target text information of a text to be recognized and original text information for the text to be recognized, the target text information including at least one of a title text and an abstract text and the original text information including at least one of comment information and bullet screen information;

the acquisition module 601 further configured to obtain a target text classification result by a text classification model based on the target text information, when the target text information meets a first malicious promotion condition, the target text classification result representing a malicious promotion extent of the target text information;

the acquisition module 601 further configured to obtain an original text classification result by the text classification model based on the original text information, when the original text information meets the first malicious promotion condition, the original text classification result representing a malicious promotion extent of the original text information; and a recognition module 602 configured to determine a text recognition result corresponding to the text to be recognized according to the target text classification result and/or the original text classification result, the text recognition result representing a malicious promotion extent of the text to be recognized.

In an embodiment of this disclosure, a recognition apparatus for multimedia content is provided. Through the aforementioned apparatus, the malicious promotion extent of multimedia content is recognized from different aspects. With regard to the media form of text type multimedia content, a more comprehensive grasp for the quality of videos is conducted in the aspects of titles, abstracts, original text information, etc. to form a more complete recognition policy for text malicious promotion, thereby improving the accuracy of recognizing the text malicious promotion.

Figure 24:
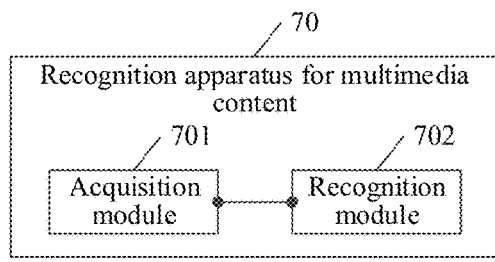
FIG. 24 is another schematic flowchart of a recognition apparatus for multimedia content according to an embodiment of this disclosure.

A recognition apparatus for multimedia content in this disclosure is described below in detail. FIG. 24 is a schematic diagram of an embodiment of a recognition apparatus for multimedia content according to an embodiment of this disclosure. The recognition apparatus for multimedia content 70 includes:

an acquisition module 701 configured to obtain image data of an image to be recognized and original text information for the image to be recognized, the original text information including at least one of comment information and bullet screen information;

a recognition module 702 configured to perform text recognition processing on the image data to obtain an image text;

the acquisition module 701 further configured to obtain an image text classification result by a text classification model based on the image text, when the image text meets a first malicious promotion condition, the image text classification result representing a malicious promotion extent of the image text;

the acquisition module 701 further configured to obtain an original text classification result by the text classification model based on the original text information, when the original text information meets the first malicious promotion condition, the original text classification result representing a malicious promotion extent of the original text information; and the recognition module 702 further configured to determine an image recognition result corresponding to the image to be recognized according to the image text classification result and/or the original text classification result, the image recognition result representing a malicious promotion extent of the image to be recognized.

In an embodiment of this disclosure, a recognition apparatus for multimedia content is provided. Through the aforementioned apparatus, the malicious promotion extent of multimedia content is recognized from different aspects. With regard to the media form of image type multimedia content, a more comprehensive grasp for the quality of images is conducted in the aspects of image data, original text information, etc. to form a more complete recognition policy for image malicious promotion, thereby improving the accuracy of recognizing the image malicious promotion.

Figure 25:
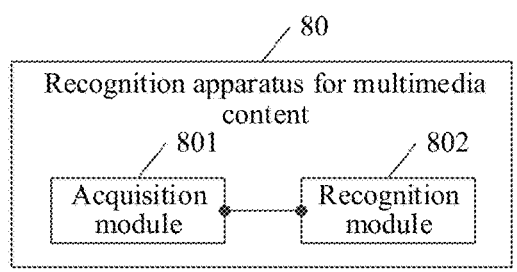
FIG. 25 is another schematic flowchart of a recognition apparatus for multimedia content according to an embodiment of this disclosure.

A recognition apparatus for multimedia content in this disclosure is described below in detail. FIG. 25 is a schematic diagram of an embodiment of a recognition apparatus for multimedia content according to an embodiment of this disclosure. The recognition apparatus for multimedia content 80 includes:

an acquisition module 801 configured to obtain audio data of an audio to be recognized and original text information for the audio to be recognized, the original text information including at least one of comment information and bullet screen information;

a recognition module 802 configured to perform text recognition processing on the audio data to obtain an audio text;

the acquisition module 801 further configured to obtain an audio text classification result by a text classification model based on the audio text, when the audio text meets a first malicious promotion condition, the audio text classification result representing a malicious promotion extent of the audio text;

the acquisition module 801 further configured to obtain an original text classification result by the text classification model based on the original text information, when the original text information meets the first malicious promotion condition, the original text classification result representing a malicious promotion extent of the original text information; and the recognition module 802 further configured to determine an audio recognition result corresponding to the audio to be recognized according to the audio text classification result and/or the original text classification result, the audio recognition result representing a malicious promotion extent of the audio to be recognized.

In an embodiment of this disclosure, a recognition apparatus for multimedia content is provided. Through the aforementioned apparatus, the malicious promotion extent of multimedia content is recognized from different aspects. With regard to the media form of audio type multimedia content, a more comprehensive grasp for the quality of audios is conducted in the aspects of audio data, original text information, etc. to form a more complete recognition policy for audio malicious promotion, thereby improving the accuracy of recognizing the audio malicious promotion.

Figure 26:
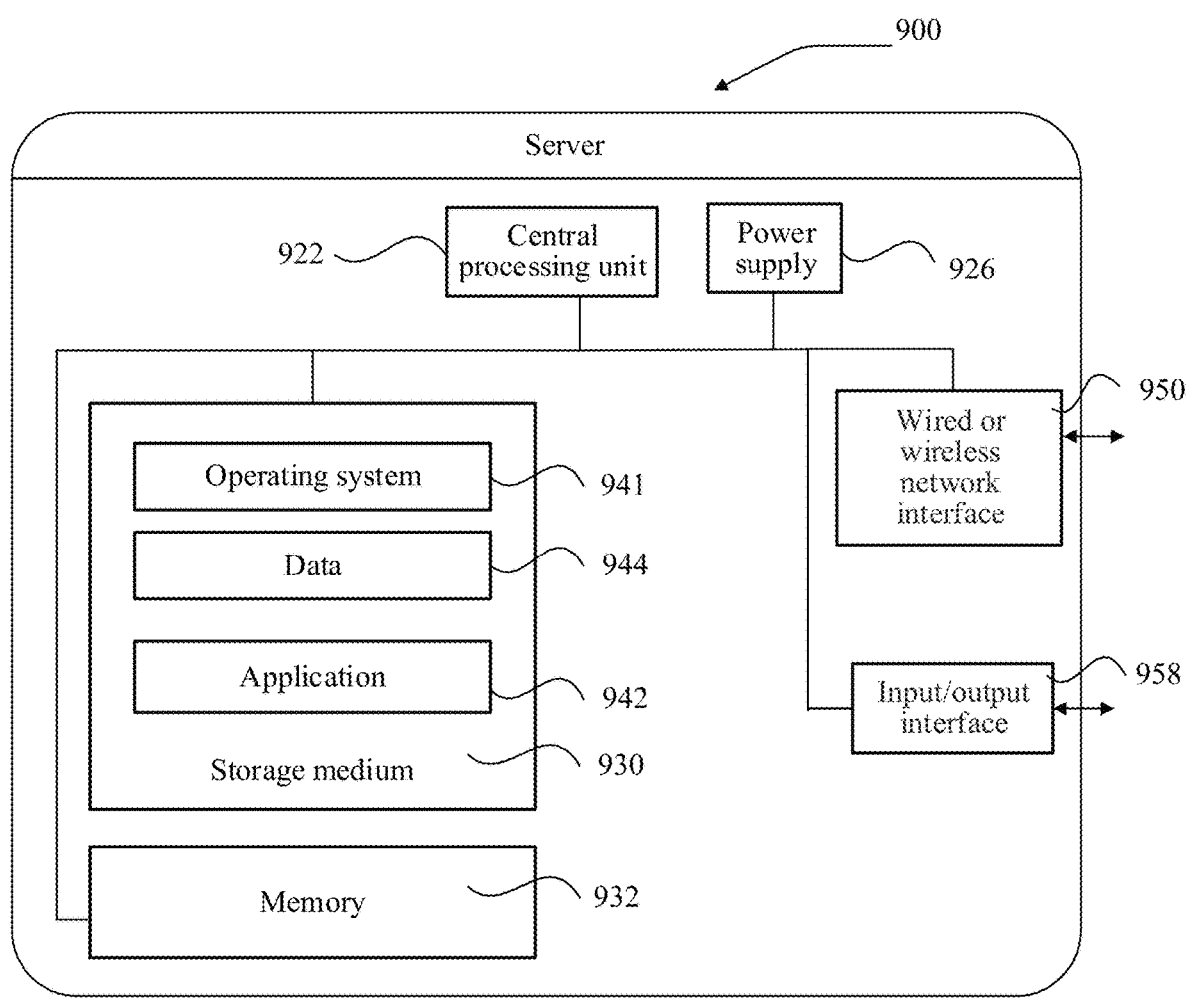
FIG. 26 is a schematic structural diagram of a server according to an embodiment of this disclosure.

The recognition apparatus for multimedia content provided by the disclosure can be deployed on a server, FIG. 26 is a schematic structural diagram of a server according to an embodiment of this disclosure. The server 900 may vary greatly due to different configurations or performance, and may include one or more central processing units (CPUs) 922 (for example, one or more processors) and a memory 932, and one or more storage media 930 (for example, one or more mass storage devices) that store an application program 942 or data 944. The memory 932 and the storage medium 930 may be transient or persistent storages. A program stored in the storage medium 930 may include one or more modules (not shown), and each module may include a series of instruction operations for the server. Further, the CPU 922 may be configured to communicate with the storage medium 930 to execute a series of instruction operations in the storage medium 930 on the server 900.

The server 900 may further include one or more power supplies 926, one or more wired or wireless network interfaces 950, one or more input/output interfaces 958, and/or one or more operating systems 941, for example, Windows Server™, Mac OS X™, Unix™, Linux™, or FreeBSD™.

The steps performed by the server in the foregoing embodiment may be based on the server structure shown in FIG. 26.

The embodiments of this disclosure further provides a computer-readable storage medium, storing a computer program, the computer program, when run on a computer, causing the computer to perform the method described in the foregoing embodiments.

The embodiments of this disclosure further provide a computer program product including a program is further provided. When the computer program product runs on a computer, the computer is caused to perform the method provided in the foregoing embodiments.

A person skilled in the art may clearly understand that, for the purpose of convenient and brief description, for a detailed working process of the system, apparatus, and unit described above, refer to a corresponding process in the method embodiments.

In the several embodiments provided in this disclosure, it should be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this disclosure may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the related art, all or some of the technical solutions may be implemented in a form of a software product. The computer software product is stored in a storage medium, and comprises several instructions for instructing a computer device (which may be a personal computer, a server, a network device, or the like) to perform all or some of the steps of the methods in the embodiments of this disclosure. The foregoing storage medium includes: any medium that can store program code, such as a USB flash drive, a removable hard disk, a read-only memory (ROM), a RAM, a magnetic disk, a compact disc, or the like.

The foregoing embodiments are merely intended for describing the technical solutions of this disclosure, but not for limiting this disclosure; Although this disclosure is described in detail with reference to the foregoing embodiments, it should be appreciated by a person skilled in the art that: modifications may still be made to the technical solutions described in the foregoing embodiments, or equivalent replacements may be made to the part of the technical features; as long as such modifications or replacements do not cause the essence of corresponding technical solutions to depart from the spirit and scope of the technical solutions of the embodiments of this disclosure.

What is claimed is:

1. A method for recognizing multimedia content, performed by a computer device, the method comprising:
    obtaining target text information and content information in a video, the target text information comprising a title text or an abstract text, and the content information comprising image data or audio data;
    performing text recognition processing on the content information to obtain associated text information, the associated text information comprising an image text or an audio text, the image text being obtained by text recognition of the image data, and the audio text being obtained by text recognition of the audio data;
    taking the target text information meeting a first malicious promotion condition or the associated text information as text content;
    executing a text classification model with the text content as input to predict a target text classification result, the target text classification result representing a malicious promotion extent of the text content, the text classification model comprising N sub-classification models, N being an integer greater than 1, each of the N sub-classification models comprises a machine learning model trained to predict a text classification sub-result for a malicious promotion type, and wherein the executing the text classification model comprises:
        respectively executing the N sub-classification models with the text content as input to predict N text classification sub-results for different types of malicious promotion; and
        determining the target text classification result based on the N text classification sub-results;
    determining a video recognition result corresponding to the video according to the target text classification result, the video recognition result representing a malicious promotion extent of the video; and
    displaying the video recognition result via a user interface.

2. The method according to claim 1, wherein the content information comprises the image data, and the performing text recognition processing on the content information to obtain associated text information comprises:

performing framing processing on the image data in the video to obtain K video frames, the K being an integer greater than or equal to 1;

selecting L video frames from the K video frames according to a preset frame rate, the L being an integer greater than or equal to 1 and less than the K;

performing optical character recognition (OCR) processing on each video frame of the L video frames to obtain a text recognition result of the each video frame, the text recognition result comprising captions and coordinate information corresponding to the captions;

performing deduplication on the captions in the each video frame of the L video frames according to the coordinate information corresponding to the captions; and taking the captions after deduplication in each video frame as the image text in the associated text information.

3. The method according to claim 1, wherein the content information comprises the audio data, and the performing text recognition processing on the content information to obtain associated text information comprises:

performing framing processing on the audio data in the video to obtain T audio frames, the T being an integer greater than or equal to 1;

performing feature extraction processing on each audio frame of the T audio frames to obtain an audio feature vector corresponding to the each audio frame; and determining the audio text in the associated text information based on the audio feature vector corresponding to the each audio frame.

4. The method according to claim 1, further comprising:

in response to the title text successfully matching with a template in a matching library and failing to match with information in a whitelist, determining that the title text meets the first malicious promotion condition and the target text information meets the first malicious promotion condition;

in response to the abstract text successfully matching with a template in the matching library and failing to match with information in the whitelist, determining that the abstract text meets the first malicious promotion condition and the target text information meets the first malicious promotion condition;

in response to the image text successfully matching with a template in the matching library and failing to match with information in the whitelist, determining that the image text meets the first malicious promotion condition and the associated text information meets the first malicious promotion condition; and in response to the audio text successfully matching with a template in the matching library and failing to match with information in the whitelist, determining that the audio text meets the first malicious promotion condition and the associated text information meets the first malicious promotion condition.

5. The method according to claim 4, wherein the obtaining the target text classification result based on the text content comprises:

in response to the title text meeting the first malicious promotion condition, executing the text classification model to predict a title text classification result based on the title text;

in response to the abstract text meeting the first malicious promotion condition, executing the text classification model to predict an abstract text classification result based on the abstract text;

in response to the image text meeting the first malicious promotion condition, executing the text classification model to predict an image text classification result based on the image text; and in response to the audio text meeting the first malicious promotion condition, executing the text classification model to predict an audio text classification result based on the audio text.

6. The method according to claim 4, wherein the obtaining the target text classification result based on the text content comprises:

in response to the title text meeting the first malicious promotion condition, executing the N sub-classification models in the text classification model to predict N title text classification sub-results respectively based on the abstract text, and determining a title text classification result according to the N title text classification sub-results, each of the N title text classification sub-results corresponding to a malicious promotion type;

in response to the abstract text meeting the first malicious promotion condition, executing the N sub-classification models in the text classification model to predict N abstract text classification sub-results respectively based on the abstract text, and determining an abstract text classification result according to the N abstract text classification sub-results, each of the N abstract text classification sub-result corresponding to a malicious promotion type;

in response to the image text meeting the first malicious promotion condition, executing the N sub-classification models in the text classification model to predict N image text classification sub-results respectively based on the image text, and determining an image text classification result according to the N image text classification sub-results, each of the N image text classification sub-results corresponding to a malicious promotion type; and in response to the audio text meeting the first malicious promotion condition, executing the N sub-classification models in the text classification model to predict N audio text classification sub-results respectively based on the audio text, and determining an audio text classification result according to the N audio text classification sub-results, each of the N audio text classification sub-result corresponding to a malicious promotion type.

7. The method according to claim 1, the content information comprises the image data, and the method further comprises:

obtaining, with an image classification model, an image classification result based on the image data, the image classification result representing a malicious promotion extent of the image data; and the determining the video recognition result corresponding to the video according to the target text classification result comprises:

determining the video recognition result corresponding to the video according to the target text classification result and the image classification result.

8. The method according to claim 7, wherein the determining the video recognition result corresponding to the video according to the target text classification result and the image classification result comprises:

in response to the image classification result indicating that the video comprises an information code and the target text classification result meets a second malicious promotion condition, determining that a video recognition result corresponding to the video is a video for malicious promotion;

in response to the image classification result indicating that the video comprises a trend chart and the target text classification result meets the second malicious promotion condition, determining that a video recognition result corresponding to the video is a video for malicious promotion; and in response to the image classification result indicating that the video is of a preset video type, determining that a video recognition result corresponding to the video is a video without malicious promotion.

9. The method according to claim 1, further comprising:

obtaining original text information for the video, the original text information comprising comment information or bullet screen information;

in response to the original text information meeting the first malicious promotion condition, obtaining, with the text classification model, an original text classification result based on the original text information, the original text classification result indicating a malicious promotion extent of the original text information;

the determining a video recognition result corresponding to the video according to the target text classification result comprises:

determining a video recognition result corresponding to the video according to the target text classification result and the original text classification result; or determining a video recognition result corresponding to the video according to the target text classification result, the original text classification result and an image classification result, the image classification result being obtained by an image classification model based on the image data and indicating a malicious promotion extent of the image data.

10. The method according to claim 1, further comprising:

obtaining provider information for the video in a current period, the provider information comprising basic information and behavior information of a content provider in the current period;

determining an identity confidence of the content provider according to the provider information;

the determining a video recognition result corresponding to the video according to the target text classification result comprises:

determining a video recognition result corresponding to the video according to the target text classification result and the identity confidence of the content provider.

11. The method according to claim 10, wherein the determining the video recognition result corresponding to the video according to the target text classification result and the identity confidence of the content provider comprises:

determining a video recognition result corresponding to the video according to the target text classification result, the original text classification result and the identity confidence of the content provider, the original text classification result being obtained by the text classification model based on original text information and indicating a malicious promotion extent of the original text information, and the original text information comprising comment information or bullet screen information; or determining a video recognition result corresponding to the video according to the target text classification result, an image classification result and the identity confidence of the content provider, the image classification result being obtained by an image classification model based on the image data and indicating a malicious promotion extent of the image data; or determining a video recognition result corresponding to the video according to the target text classification result, the original text classification result, the image classification result and the identity confidence of the content provider.

12. The method according to claim 1, wherein the determining the video recognition result corresponding to the video according to the target text classification result comprises:

in response to the target text classification result being greater than or equal to a target text classification threshold, determining that a video recognition result corresponding to the video is of a malicious promotion type;

in response to the target text classification result being less than the target text classification threshold, determining that a video recognition result corresponding to the video is of a non-malicious promotion type;

in response to the target text classification result being greater than or equal to a target text classification threshold and an original text classification result being greater than or equal to an original text classification threshold, determining that a video recognition result corresponding to the video is of a malicious promotion type;

in response to the target text classification result being greater than or equal to a target text classification threshold, the original text classification result being greater than or equal to the original text classification threshold and an image classification result being greater than or equal to an image classification threshold, determining that a video recognition result corresponding to the video is of a malicious promotion type;

in response to the target text classification result being greater than or equal to a target text classification threshold, the original text classification result being greater than or equal to the original text classification threshold, the image classification result being greater than or equal to the image classification threshold and an identify confidence of a content provider being greater than or equal to an identify confidence threshold, determining that a video recognition result corresponding to the video is of a malicious promotion type;

after determining a video recognition result corresponding to the video according to the target text classification result, the method further comprising:

obtaining a video annotation result corresponding to the video; and in response to the video recognition result being inconsistent with the video annotation result, adjusting at least one of the target text classification threshold, the original text classification threshold, the image classification threshold and the identify confidence threshold.

13. An apparatus for recognizing multimedia content, comprising:

a memory operable to store computer-readable instructions; and a processor circuitry operable to read the computer-readable instructions, the processor circuitry when executing the computer-readable instructions is configured to:

obtain target text information and content information in a video, the target text information comprising a title text or an abstract text, and the content information comprising image data or audio data;

perform text recognition processing on the content information to obtain associated text information, the associated text information comprising an image text or an audio text, the image text being obtained by text recognition of the image data, and the audio text being obtained by text recognition of the audio data;

take the target text information meeting a first malicious promotion condition or the associated text information as text content;

execute a text classification model with the text content as input to predict a target text classification, the target text classification result representing a malicious promotion extent of the text content, the text classification model comprising N sub-classification models, N being an integer greater than 1, each of the N sub-classification models comprises a machine learning model trained to predict a text classification sub-result for a malicious promotion type, and wherein the computer-readable instructions is configured to execute the text classification model to predict the target text classification by respectively executing the N sub-classification models with the text content as input to predict N text classification sub-results for different types of malicious promotion; and determining the target text classification text based on the N text classification sub-results; and determine a video recognition result corresponding to the video according to the target text classification result, the video recognition result representing a malicious promotion extent of the video.

14. The apparatus according to claim 13, wherein the processor circuitry is configured to:

perform framing processing on the image data in the video to obtain K video frames, the K being an integer greater than or equal to 1;

select L video frames from the K video frames according to a preset frame rate, the L being an integer greater than or equal to 1 and less than the K;

perform optical character recognition (OCR) processing on each video frame of the L video frames to obtain a text recognition result of the each video frame, the text recognition result comprising captions and coordinate information corresponding to the captions;

perform deduplication on the captions in the each video frame of the L video frames according to the coordinate information corresponding to the captions; and take the captions after deduplication in each video frame as the image text in the associated text information.

15. The apparatus according to claim 13, wherein the content information comprises the audio data, and the processor circuitry is configured to:

perform framing processing on the audio data in the video to obtain T audio frames, the T being an integer greater than or equal to 1;

perform feature extraction processing on each audio frame of the T audio frames to obtain an audio feature vector corresponding to the each audio frame; and determine the audio text in the associated text information based on the audio feature vector corresponding to the each audio frame.

16. The apparatus according to claim 13, the processor circuitry is further configured to:

in response to the title text successfully matching with a template in a matching library and failing to match with information in a whitelist, determine that the title text meets the first malicious promotion condition and the target text information meets the first malicious promotion condition;

in response to the abstract text successfully matching with a template in the matching library and failing to match with information in the whitelist, determine that the abstract text meets the first malicious promotion condition and the target text information meets the first malicious promotion condition;

in response to the image text successfully matching with a template in the matching library and failing to match with information in the whitelist, determine that the image text meets the first malicious promotion condition and the associated text information meets the first malicious promotion condition; and in response to the audio text successfully matching with a template in the matching library and failing to match with information in the whitelist, determine that the audio text meets the first malicious promotion condition and the associated text information meets the first malicious promotion condition.

17. The apparatus according to claim 13, the content information comprises the image data, and the processor circuitry is further configured to:

execute an image classification model to predict an image classification result based on the image data, the image classification result representing a malicious promotion extent of the image data; and determine the video recognition result corresponding to the video according to the target text classification result and the image classification result.

18. The apparatus according to claim 13, the processor circuitry is further configured to:

obtain original text information for the video, the original text information comprising comment information or bullet screen information;

in response to the original text information meeting the first malicious promotion condition, execute the text classification model to predict an original text classification result based on the original text information, the original text classification result indicating a malicious promotion extent of the original text information; and determine a video recognition result corresponding to the video according to the target text classification result, the original text classification result and an image classification result, the image classification result being obtained by an image classification model based on the image data and indicating a malicious promotion extent of the image data.

19. The apparatus according to claim 13, the processor circuitry is further configured to:

obtain provider information for the video in a current period, the provider information comprising basic information and behavior information of a content provider in the current period;

determine an identity confidence of the content provider according to the provider information;

determine a video recognition result corresponding to the video according to the target text classification result and the identity confidence of the content provider.

* * * * *